US009489044B2

(12) United States Patent
Fateh

(10) Patent No.: US 9,489,044 B2
(45) Date of Patent: Nov. 8, 2016

(54) VISUAL STABILIZATION SYSTEM FOR HEAD-MOUNTED DISPLAYS

(71) Applicant: Eye Labs, LLC, Mountain View, CA (US)

(72) Inventor: Sina Fateh, Mountain View, CA (US)

(73) Assignee: EYE LABS, LLC, Mountain View, CA (US)

( * ) Notice: Subject to any disclaimer, the term of this patent is extended or adjusted under 35 U.S.C. 154(b) by 0 days.

(21) Appl. No.: 14/936,520

(22) Filed: Nov. 9, 2015

(65) Prior Publication Data

US 2016/0131908 A1 May 12, 2016

Related U.S. Application Data

(60) Provisional application No. 62/077,100, filed on Nov. 7, 2014.

(51) Int. Cl.
*G06F 3/01* (2006.01)
*G02B 27/01* (2006.01)
(Continued)

(52) U.S. Cl.
CPC ........... *G06F 3/011* (2013.01); *G02B 27/0093* (2013.01); *G02B 27/0172* (2013.01); *G02B 27/0176* (2013.01); *G02B 27/646* (2013.01);
(Continued)

(58) Field of Classification Search
CPC ... G06T 15/00; G06T 19/00; H04N 13/0018; H04N 2213/008; H04N 13/0003
See application file for complete search history.

(56) References Cited

U.S. PATENT DOCUMENTS

2008/0125218 A1* 5/2008 Collins .................. G06Q 90/00 463/31
2011/0213664 A1* 9/2011 Osterhout ........... G02B 27/017 705/14.58

(Continued)

FOREIGN PATENT DOCUMENTS

EP 0660154 A1 6/1995
EP 1444946 A1 8/2004

(Continued)

OTHER PUBLICATIONS

International Search Report and Written Opinion mailed Feb. 16, 2016, for International Application No. PCT/US2015/059768 filed Nov. 9, 2015.

(Continued)

*Primary Examiner* — Hung Dang
*Assistant Examiner* — Sunghyoun Park
(74) *Attorney, Agent, or Firm* — Perkins Coie LLC

(57) ABSTRACT

Introduced herein are various techniques for displaying virtual and augmented reality content via a head-mounted display (HMD). The techniques can be used to improve the effectiveness of the HMD, as well as the general experience and comfort of users of the HMD. A binocular HMD system may present visual stabilizers to each eye that allow users to more easily fuse the digital content seen by each eye. In some embodiments the visual stabilizers are positioned within the digital content so that they converge to a shared location when viewed by a user, while in other embodiments the visual stabilizers are mapped to different locations within the user's field of view (e.g., peripheral areas) and are visually distinct from one another. These techniques allow the user to more easily fuse the digital content, thereby decreasing the eye fatigue and strain typically experienced when viewing virtual or augmented reality content.

18 Claims, 17 Drawing Sheets

300A 310 318 306 304 312 302

(51) Int. Cl.

| | |
|---|---|
| ***G06T 19/00*** | (2011.01) |
| ***G06T 7/00*** | (2006.01) |
| ***G06T 3/40*** | (2006.01) |
| ***G02B 27/00*** | (2006.01) |
| ***G06F 3/0484*** | (2013.01) |
| ***G09G 3/00*** | (2006.01) |
| ***G02B 27/64*** | (2006.01) |
| ***G06F 3/02*** | (2006.01) |
| ***G06F 3/041*** | (2006.01) |
| ***G06F 3/044*** | (2006.01) |
| ***G06F 3/045*** | (2006.01) |
| ***G06F 3/0481*** | (2013.01) |

(52) U.S. Cl.

CPC ............... *G06F 3/012* (2013.01); *G06F 3/013* (2013.01); *G06F 3/016* (2013.01); *G06F 3/017* (2013.01); *G06F 3/0202* (2013.01); *G06F 3/044* (2013.01); *G06F 3/045* (2013.01); *G06F 3/0414* (2013.01); *G06F 3/04817* (2013.01); *G06F 3/04842* (2013.01); *G06F 3/04845* (2013.01); *G06F 3/04847* (2013.01); *G06T 3/40* (2013.01); *G06T 7/003* (2013.01); *G06T 19/006* (2013.01); *G09G 3/003* (2013.01); *G02B 2027/014* (2013.01); *G02B 2027/0132* (2013.01); *G02B 2027/0138* (2013.01); *G02B 2027/0147* (2013.01); *G02B 2027/0178* (2013.01); *G06T 2200/04* (2013.01); *G06T 2200/24* (2013.01); *G06T 2207/20172* (2013.01); *G06T 2210/36* (2013.01); *G09G 2340/0407* (2013.01)

(56) References Cited

U.S. PATENT DOCUMENTS

| | | | | |
|---|---|---|---|---|
| 2012/0007970 | A1* | 1/2012 | Ko | H04N 13/0438 348/56 |
| 2012/0182405 | A1* | 7/2012 | Huang | H04N 13/0497 348/54 |
| 2014/0132738 | A1* | 5/2014 | Ogura | H04N 13/0239 348/47 |
| 2015/0363979 | A1* | 12/2015 | Takano | A61B 6/461 345/633 |
| 2016/0133053 | A1* | 5/2016 | Fateh | G06F 3/012 345/633 |

FOREIGN PATENT DOCUMENTS

| | | | |
|---|---|---|---|
| JP | 07212798 | A | 8/1995 |
| JP | 2011197750 | A | 10/2011 |
| WO | 03092482 | A1 | 11/2003 |
| WO | 2014033306 | A1 | 3/2014 |

OTHER PUBLICATIONS

U.S. Appl. No. 14/936,490 by Fateh, S., filed Nov. 9, 2015.

* cited by examiner

Original presentation without visual stabilizer. The images are unstable.

Peripheral presentation of the content including peripheral visual stabilizers.

600

638

Final View

VISUAL STABILIZATION SYSTEM FOR HEAD-MOUNTED DISPLAYS

CROSS REFERENCE TO RELATED APPLICATION

This application claims benefit of U.S. Provisional Patent Application No. 62/077,100, filed Nov. 7, 2015 and titled "Methods and Systems for Head Mounted Display," which is incorporated by reference herein in its entirety.

RELATED FIELD

The present technology relates to display devices for virtual and augmented reality content, and more specifically to methods and systems that improve the effectiveness of head-mounted displays (HMDs) and the comfort of users.

BACKGROUND

HMDs, such as helmet-mounted displays and eyeglass-mounted displays, are display devices, worn on the head (e.g., as part of a helmet, eyeglasses, or visor) that has a display optic in front of one (monocular HMD) or both eyes (binocular HMD). As further described below, an HMD typically includes optical displays with lenses and semi-transparent mirrors. The displays are generally miniaturized and may include light emitting diodes (LEDs), liquid crystal displays (LCDs), etc.

HMDs differ from one another in several aspects. For example, some HMDs can only display a computer-generated image (CGI), which may be referred to as a virtual image. Other HMDs are able to show a combination of a CGI and live images from the real world. Such embodiments can be referred to as augmented reality.

Although HMDs have been developed for use in numerous applications (e.g., gaming, medicine, training/simulation), continued use often causes the user's eyesight to be strained. Extended exposure to virtual and augmented reality environments has also been associated with symptoms similar to motion sickness, such as general discomfort, headache, nausea, and disorientation. Therefore, a need exists to improve the general effectiveness of HMDs and the comfort of users, especially those who are exposed to virtual or augmented reality for extended periods of time.

DISCLOSURE OVERVIEW

Introduced herein are a variety of embodiments for methods and systems for displaying virtual and augmented reality content to a user through an HMD. Various embodiments described herein can also be used to improve the effectiveness of an HMD and the comfort and general experience of a user of the HMD. For example, a binocular HMD system can assist users by maintaining and merging two separate images comfortably without visual discomfort. The HMD system could, for example, present a visual stabilizer to each eye that can be merged together in binocular view to create a strong fusional system. A strong fusional system often results in a decrease in eye fatigue and strain experienced by the user, thereby creating a binocular HMD system and improving the user experience.

An HMD system could also improve the visual comfort and binocular stability of the user by modifying the size of the overlap (i.e., the portion of two distinct images that can be seen simultaneously by each of the user's eyes). The HMD system can adjust the overlap of two separate images presented to each of the user's eyes based on, for example, the perceived focal distance and type of application. In some embodiments, these adjustments occur in real-time.

The HMD system may also provide improved resolution perception in a wide field of view by decreasing the resolution of an image (i.e., a CGI) viewed by a user in a first area and/or increasing the resolution in a second area based on the user characteristics. Sample characteristics include the speed of the user's head movement and the motion of the user's eyes. The HMD system can also include a tracking system that accurately measures the speed of the user's head movement and the motion of the user's eyes. These measurements can be used to dramatically improve the quality, perception, and stability of digital content displayed to a user.

Although some existing HMDs employ three-dimensional ("3D") depth sensing systems for tracking and detecting the user's hand motions and gestures, the resolution and accuracy of these systems are poor outside of a limited number of lighting environments (e.g., indoor lighting). Various embodiments described herein, however, can modify and/or adapt a user interface and/or an HMD input system based on the illuminance as measured by one or more sensors coupled to the HMD. Several HMD systems described herein improve the resolution and accuracy of 3D depth sensing systems in a broad range of lighting environments (e.g., bright, outdoor).

In some embodiments, a combined HMD system includes a first optic configured to present digital content up to a predetermined distance away (e.g., 0.5, 1, 2.5 meters) and a second optic configured to present digital content whose distance exceeds the predetermined distance. For example, the first optic may be adapted for close-range viewing, while the second optic may be adapted for long-range viewing. Traditionally, binocular HMD systems have been designed for either long-range or close-range viewing. That is, binocular HMD systems typically have two separate displays and two separate optical systems for presenting long-range and close-range content to a user. The various HMD systems described herein can further include a visual balancing system (e.g., managed by visual balancing software) that is able to properly balance the different images and improve the user's viewing experience.

An HMD could also be configured to track gestures and/or vocal commands of the user. Gestures may include, for example, pushing the nose bridge of the frame of the HMD, applying pressure to the frame with one or both hands, and pushing the frame upward or laterally. The gestures and vocal commands can be used to control and/or modify the user interface of the HMD, trigger a command input (e.g., select, zoom, modify overlap, modify resolution), or some combination thereof.

Various embodiments of the HMD system described herein can also implement animated digital content that simulates the change of distance as observed by the user. Effective superimposition of digital content requires constant measuring, processing, and analyzing of information related to distance of the observed focal object, calibration of a camera, eye gaze position, etc. Various properties (e.g., convergence, brightness) of the animated digital content can be modified to more accurately imitate the user's perceived change of distance. Superimposition techniques such as these are likely to be most useful when employed by HMDs that present augmented reality content.

The Overview is provided to introduce a selection of concepts in a simplified form that are further described below in the Detailed Description. Some embodiments have other aspects, elements, features, and steps in addition to or in place of what is described above. These potential additions and replacements are described throughout the rest of the specification. Other advantages and features will become apparent when viewed in light of the Detailed Description and when taken in conjunction with the attached drawings and claims.

BRIEF DESCRIPTION OF THE DRAWINGS

These and other objects, features and characteristics of the present invention will become more apparent to those skilled in the art from a study of the following Detailed Description in conjunction with the appended claims and drawings, all of which form a part of this specification.

Figure 1:
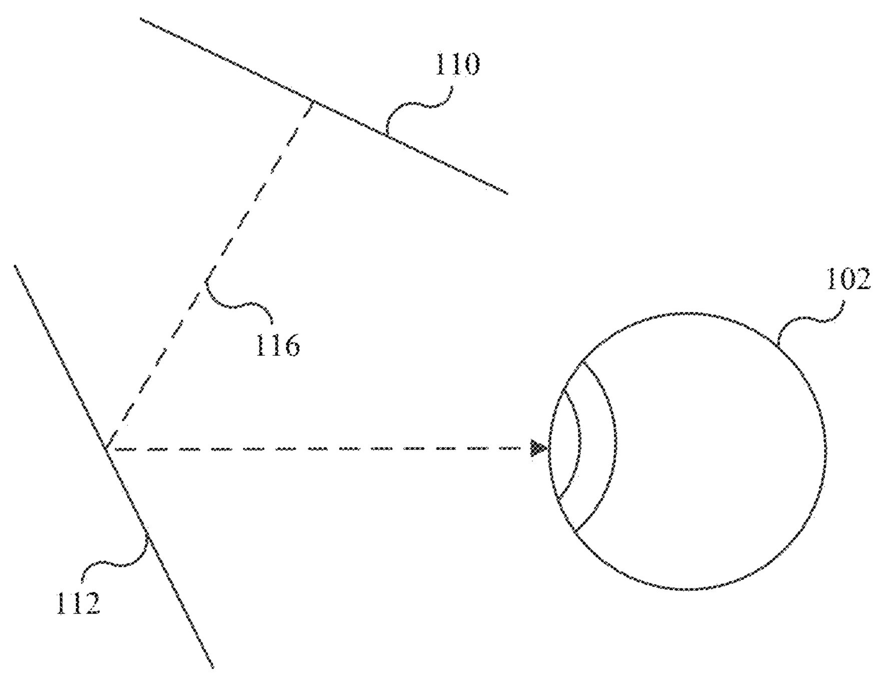
FIG. 1 is a schematic diagram showing basic components of an HMD.

The figures depict various embodiments of this disclosure for purposes of illustration only. One skilled in the art will readily recognize from the following Detailed Description that alternative embodiments of the systems and methods illustrated herein may be employed without departing from the principles of the invention described herein.

DETAILED DESCRIPTION

References will be made below in the Detailed Description to various embodiments, which are illustrated in the accompanying drawings. The same or similar reference numerals have been used throughout the drawings to refer to the same or like parts. The accompanying figures are included to provide a further understanding of the invention. It will be understood by one skilled in the art that various features of the embodiments described within the Detailed Description and the figures can be used in any and all combinations.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. The words "associate with," meanwhile, means connecting or relating objects, items, etc. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or another output using specified input(s). A module may or may not be self-contained. An application or software program may include one or more modules, or a module may include one or more applications or software programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Ocular Operations and Implications

Figure 13:
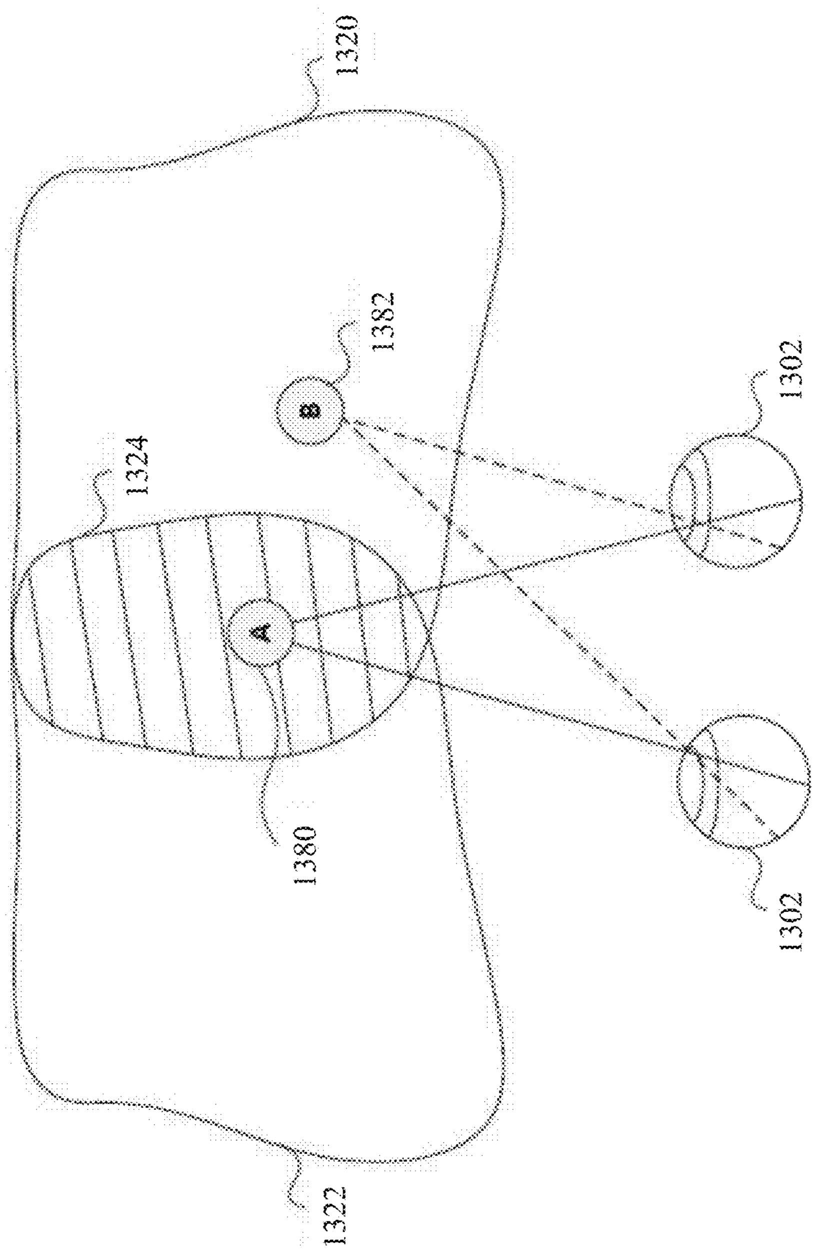
FIG. 13 depicts retinal correspondence and non-correspondence points.

FIG. 13 depicts retinal correspondence and non-correspondence points. When the user's eyes 1302 focus on a focal point (e.g., retinal correspondence point 1380), three distinct viewing areas are naturally created: an area seen only by the user's right eye 1320, an area seen only by the user's left eye 1322, and an area seen by both of the user's eyes 1324. The area seen by both of the user's eyes 1324 is also referred to as the overlap.

In some embodiments, the user triggers one or more actions (e.g., overlap modifications, user interface modification, brightness change) by focusing on a retinal correspondence point 1380. When a user focuses on a retinal correspondence point, each of the user's eyes 1302 share a common subjective visual direction. More specifically, simultaneous stimulation results in the subjective sensation that the focal point comes from the same direction in space. If the simultaneous stimulation of the retinal areas in each of the user's eyes 1302 results in the sensation of two distinct visual directions for a target (i.e., diplopia), the focal point is said to be a non-correspondence point 1382.

Various techniques described herein can be implemented by observing the location and occurrence of the user's retinal correspondence points 1380. For example, overlap modifications, placement of visual stabilizers, and augmented reality animations could all require (or prefer) that accurate tracking of the user's retinal correspondence points 1380 be performed. Accurate tracking of the user's retinal correspondence points 1380 may result in a more effective viewing experience (e.g., better resolution, less eye fatigue) for the user.

Figure 14:
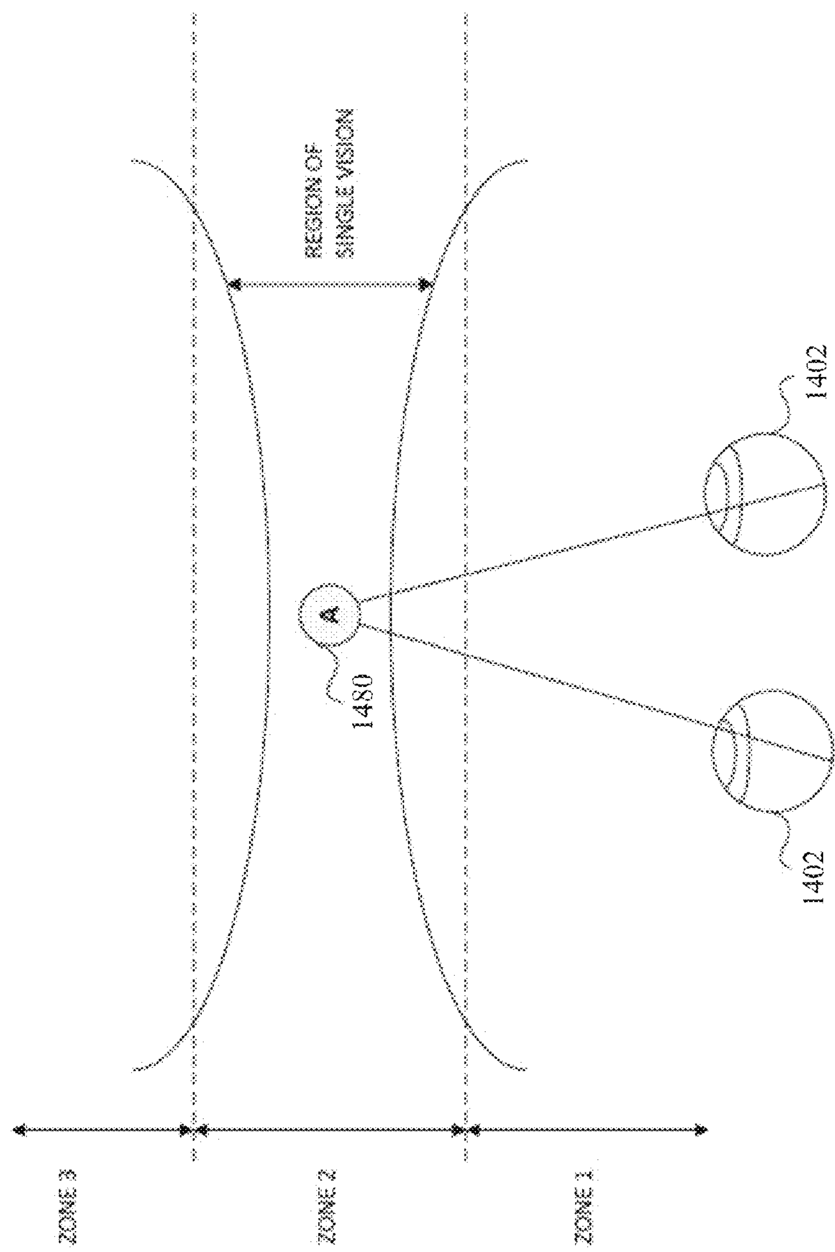
FIG. 14 shows a single focal point and the corresponding region of single vision.

FIG. 14 shows a single focal point 1480 and the corresponding region of single vision. When each of the user's eyes 1402 fixate on a focal point 1480 and normal retinal correspondence exists, the focal point is seen singly. That is, only a single image of the focal point is recognized by the user. Normal retinal correspondence requires that the corresponding retinal areas in the user's two eyes 1402 bear identical relationships to the fovea in each eye (i.e., both corresponding areas are located equidistantly to the right/left and above/below the fovea). Points located on either side of the focal point 1480 also fall on retinal correspondence points and can be seen singly. The points that can be seen singly constitute a horizontal construct known as the Vieth-Müller circle. The Vieth-Müller circle includes a 3D curved surface, also referred to as an empirical horopter.

Points not lying within the Vieth-Müller circle fall on retinal non-correspondence points and would be expected to cause the user to see double (i.e., diplopia). However, double vision does not occur within a limited area surrounding the Vieth-Müller circle because the user's brain fuses the two distinct images captured by each of the user's eyes 1402. This space, illustrated as a band in FIG. 14 and labeled "Region of Single Vision," is called Panum's area of single binocular vision. Objects outside Panum's area fall on retinal non-correspondence points and are seen as two distinct visual images (i.e., diplopia).

HMD systems can account for these phenomena by segmenting the user's viewing field into at least three distinct fields. For example, a first zone (e.g., Zone 1 of FIG. 14) may include digital content to be displayed up to 70 cm from the user. A second zone (e.g., Zone 2 of FIG. 14) may include any digital content that is to be displayed between 70 cm and 1.5 m. A third zone (e.g., Zone 3 of FIG. 14) may include digital content to be displayed at a distance that exceeds 1.5 m. One skilled in the art will recognize the fields described herein may correspond to different viewing distances and may increase or decrease in number. The example numbers used here are for illustration only. An increase in the number of viewing fields implemented by the HMD may result in a more effective display of digital augmented reality content.

The distinct viewing fields can be used by the HMD to trigger various actions or modifications. In some embodiments, animated digital content can be configured to animate based on which viewing field includes the focal point 1480. For example, if the HMD determines the focal point 1480 is located in Zone 1, the HMD may project digital content that completes a predetermined animation (e.g., slides forward toward the user or shakes). Similarly, if the HMD determines the focal point 1480 is located in Zone 2, the HMD system may project digital content that completes another predetermined animation (e.g., slides away from the user, decreases in brightness).

The HMD could also determine where to present augmented reality content based on input from the user. For example, the HMD may determine which zone includes the focal point 1480 based on recognizing a particular gesture (e.g., pointing). Upon recognizing the gesture, the HMD may perform an action (e.g., zoom to the focal point and present augmented reality content).

In some embodiments, the overlap viewed by the user (e.g., overlap 1324 of FIG. 13) is modified based on which viewing field includes the focal point 1480. For instance, if the HMD determines the focal point 1480 is located in Zone 1, the HMD may project a larger overlap (i.e., more of the digital content is shared between the two images and can be seen by both of the user's eyes). If the HMD instead determines the focal point 1480 is located in Zone 2, the HMD may project a smaller overlap (i.e., less content within the two images can be seen by both of the user's eyes).

Visual stabilizers embedded within the digital content can also be modified based on which viewing field includes the focal point 1480. For example, if the HMD determines the focal point 1480 is located in Zone 1, the HMD may generate and display a series of visual stabilizers (e.g., frame, clouds, trees). Alternatively, if the HMD determines the focal point 1480 is located in Zone 2, the HMD may generate and display another series of visual stabilizers (e.g., frame and clouds only) that differs from the original series of visual stabilizers. Various properties of the visual stabilizers (e.g., brightness, contrast, size) can be modified based on which viewing field includes the focal point 1480.

The HMD can also include a tracking system that can accurately measure the focal point of the user's eyes. The tracking system may include one or more sensors configured to measure the speed and direction of the user's head and eye movement. The sensor(s) could include, for example, motion/movement sensors (e.g., accelerometers) and/or optical sensors (e.g., infrared sensors). In some embodiments, the focal point of the user's eyes is tracked in real-time. When the focal point is tracked in real-time, the overlap may be modified and/or the digital content may be animated in real-time.

System Overview

FIG. 1 shows several basic elements of an HMD, which includes an image display system 110 and an optical display surface 112 configured to reflect light 116. More specifically, light 116 can be emitted from the image display system 110 and reflected by optical display surface 112 towards the user's eye 102.

As described above, HMDs can be configured to display two different types of digital imagery. First, some HMDs are configured to display simulated (e.g., computer-generated) digital images that together form an entirely virtual environment. This is referred to as "virtual reality." Virtual reality generally requires the user wear a helmet, goggles, etc. that form an enclosed area around the user's eyes and block out the real-world. Second, some HMDs are configured to display simulated (e.g., computer-generated) images that are integrated into real world content perceived by the user. This is referred to as "augmented reality." Augmented reality allows the user to concurrently view virtual and real world imagery and, in some instances, interact with virtual content that relates to what is seen the real world. Generally, the user is able to distinguish between the two. For example, augmentation may take place through superposition of a simulated image on a non-simulated, real world image, which can allow the user to view additional data relevant to a desired task, the local environment, etc. In various embodiments, the simulated image can be adapted to allow for user interaction.

HMD systems also fall into three general categories: binocular, bi-ocular, and monocular systems. Binocular HMD systems present a separate image to each eye of the user, while bi-ocular HMD systems present a single image to both of the user's eyes, and monocular HMD systems present a single image to only one eye of the user. See, for example, FIGS. 2A-B, which depict a binocular HMD system and a monocular HMD system, respectively.

Because binocular HMD systems present distinct images to each of the user's eyes, the user must make a constant fusional effort to maintain a simultaneous view of the content. The constant fusional effort required by binocular HMD systems causes eye fatigue and strain over time, one of the main causes of visual discomfort for users of augmented and virtual reality systems. Those users with weak binocular vision or preexisting visual disorders are more likely to experience severe symptoms and/or aggravation of the preexisting visual disorder.

The content (e.g., simulated images) of binocular HMD systems is generally presented to the user with an overlap (i.e., the portion of each of the two separate images can be seen simultaneously by each of the user's eyes). The size of the overlap (illustrated in FIG. 4) may vary based on the device type, content, application, etc.

One of the major challenges of augmented reality is correctly superimposing digital content onto the 3D real world environment perceived by the user. Effective and efficient superposition is complicated due to the difficulty of accurately tracking the user's eyes, which constantly change their fixation distance on various objects.

Figure 2B:
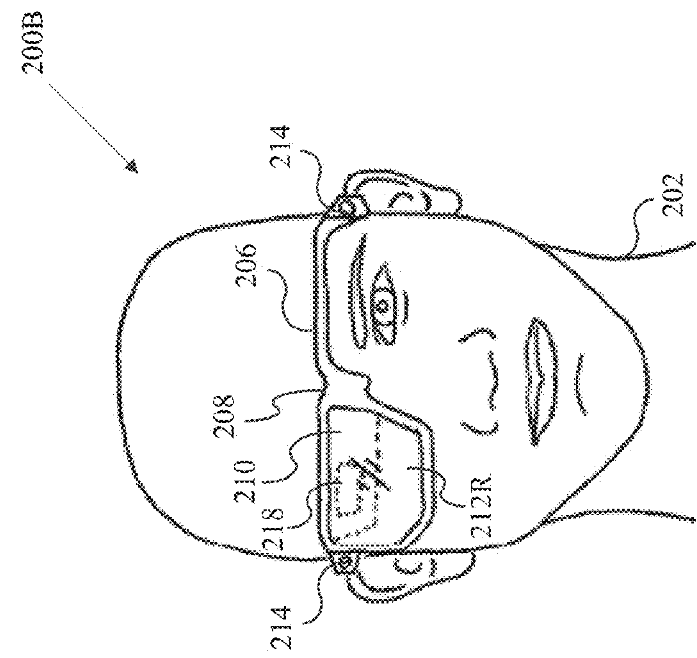
FIG. 2B is a front view representation of a monocular HMD according to various embodiments.
Figure 2A:
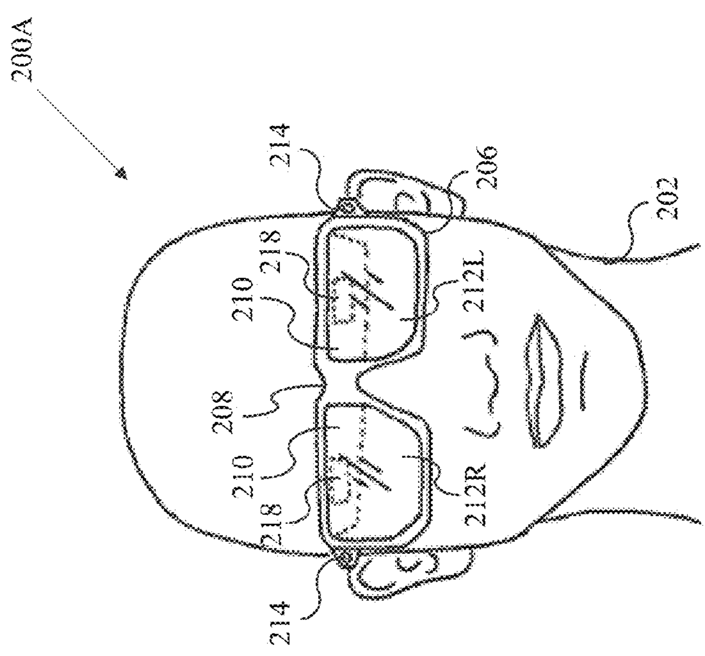
FIG. 2A is a front view representation of a binocular HMD according to various embodiments.

FIG. 2A is a front view representation of a binocular HMD system 200A according to various embodiments. The binocular HMD system 200A includes a frame 206, a bridge 208, an image display system 210, optical display surfaces 212L, 212R, and one or more sensors 214. The frame 206 can be configured to support the binocular HMD system 200A similar to conventional glasses. That is, the frame 206 may be supported by the user's ears and the bridge 208 may be supported by the user's nose. Although the binocular HMD system 200A resembles a pair of conventional eyeglasses, the binocular HMD system 200A could also resemble goggles, a helmet, a visor, etc. The frame 206 of the binocular HMD system 200A can be modified so long as the user 202 can view virtual or augmented reality content on the optical display surfaces 212L, 212R (collectively referred to as "optical display surface 212") in the proper orientation.

The binocular HMD system 200A includes at least one image display system 210 and at least one optical display surface 212. The optical display surface could include an optical display surface for the user's left eye 212L and/or an optical display surface for the user's right eye 212R. In some embodiments, a single optical display surface 212 can be viewed by both eyes concurrently. The optical display surface 212 may also be curved in order to enlarge the viewing field and improve the viewing experience of the user. In some embodiments the optical display surface 212 is opaque, thereby allowing the user 202 to view virtual reality content without interruption, while in other embodiments the optical display surface 212 may be transparent or semi-transparent, thereby allowing the user 202 to view augmented reality and real world content simultaneously.

The optical display surface 212 may completely surround one or both eyes of the user. As described above, in some embodiments the optical display surface can comprise two separate optical display surfaces (e.g., 212L and 212R). The user's right eye may be shown a first representation of a 3D digital image on optical display surface 212R, and the user's left eye may be shown a second representation of the 3D digital image on optical display surface 212L. The distinct optical display surfaces 212L, 212R can be optimized to present the digital environment relative to the location of the user's eyes. In such embodiments, the distinct optical display surfaces 212L, 212R could be optimized independently or collectively. In some embodiments, the optical display surface 212 includes a single optical display surface, some portion of which is viewable by both eyes and some portion of which is viewable by only one eye. The bridge 208 may have one or more reflectors arranged adjacent to the optical display surface(s) 212 in order to provide an immersive and realistic digital environment.

The binocular HMD system 200A can also include an electronics module 218, which can process digital content, analyze data collected by the sensor(s) 214, optimize digital content presented to the user 202, etc. The electronics module 218 and binocular HMD system 200A may be powered through a wired or wireless (e.g., battery) medium.

As further described below, the image display system(s) 210 can be positioned in several different orientations. For example, the image display system(s) 210 could be coupled to the frame 206 and oriented toward the optical display surface 212 or, alternatively, within (or behind) the optical display surface 212 itself. In some embodiments, a first image display system is configured to project light toward (i.e., display digital images on) optical display surface 212L, and a second image display system is configured to project light toward optical display surface 212R. The image display systems could project the same digital image, similar digital images, or different digital images to the user 202. The placement of the image display system 210 may relate to the placement and angle of the optical display surface 212. Moreover, the placement and angle of image display system 210 may depend on one or more properties (e.g., pixel count, resolution, brightness) of the digital content that is to be projected onto, and reflected from, the optical display surface 212. The image display system 210 may, for example, use light emitting diodes (LEDs), liquid crystal displays (LCDs), organic light emitting diodes (OLEDs), or some combination thereof. The image display system 210 generally uses small-form displays capable of high resolution (i.e., high pixel density) display, which are more readily able to create an immersive and realistic virtual reality environment for the user 202.

Sensor(s) 214 may be coupled to the frame 206 and/or the optical display surface 212 to monitor various aspects of the user's local real world environment. For example, the sensor(s) could be coupled to opposite sides of the binocular HMD system 200A and configured to gather data, which is then processed and analyzed by the electronics module 218. The data gathered by the sensor(s) 214 can be used (e.g., by the electronics module 218) to optimize the digital content that is presented to the user 202. The sensor 214 is typically coupled to the electronics module 218 to receive power. However, the sensor 218 could also be configured to receive power from a distinct power source. Sensor(s) 214 may be a camera configured to capture the user's interactions with the local environment, a light sensor configured to track illuminance levels within the local environment, an audio sensor configured to sense vocal commands, etc. In some embodiments, a plurality of sensors 214 are coupled to the frame 208. The plurality of sensors 214 may be a plurality of the same sensor (e.g., multiple cameras or microphones) or a combination of different sensors, such as those described above. The plurality of sensors 214 might be chosen such that a particular HMD system is adapted for particular applications (e.g., outdoor use, athletic activities, medical applications).

FIG. 2B is a front view representation of a monocular HMD system 200B according to various embodiments described herein. The monocular HMD system 200B includes a frame 206, a bridge 208, an image display system 210, an optical display surface 212R, and one or more sensors 214. The monocular HMD system 200B is, in large part, comparable to the binocular HMD system 200A described above. One skilled in the art will recognize the similarities and, accordingly, only the differences will be discussed.

Monocular HMD system 200B includes an image display system 210 and an optical display surface 212R. In contrast to the binocular HMD system 200A described above, monocular HMD system 200B has a single optical display surface 212 that is viewable by one of the user's eyes. See, for example, FIG. 2B, which illustrates monocular HMD system 200B as including an optical display surface 212R for the user's right eye. Note, however, that the optical display surface 212 of the monocular HMD system 200B could be adapted for a user's left eye (e.g., optical display surface 212L) or right eye (e.g., optical display surface 212R).

In some embodiments, a binocular HMD system 200A actually includes two distinct monocular optical displays. Thus, the binocular HMD system 200A can include a first optical display configured to present augmented or virtual reality content up to a predetermined distance away, and a second optical display configured to present augmented or virtual reality content whose distance exceeds the predetermined distance. For example, the binocular HMD system 200A may include a first optic display that presents content for long-range viewing (e.g., greater than 1, 2.5, or 5 meters) and a second optic display that presents content for close-range viewing (e.g., less than 1, 2.5, or 5 meters), thereby creating a combined HMD system. The first optic display may use optical display surface 212L, while the second optic display may use optical display surface 212R.

The combined HMD system may also include an electronics module (e.g., electronics module 218) that executes visual balancing software or is communicatively coupled to a visual balancing module. The visual balancing module may, for example, use a fusional stabilizer system to balance the different images displayed on the first optical display and the second optical display. In some embodiments, the combined HMD system can switch from a binocular viewing mode (i.e., first optical display and second optical display displayed simultaneously) to a monocular viewing mode, whereby one image display system 210 (or part of the image display system 210) and its corresponding optical display surface (e.g., 212L) are turned off or put into sleep/hibernate mode. When the HMD system is in monocular viewing mode, digital content can only be presented to one of the user's eyes.

In some embodiments, the combined HMD system may use progressive optical lenses for one or both of the user's eyes. Progressive optical lenses are characterized by a gradient of increasing lens power distributed throughout the lens associated with each of the user's eyes. Accordingly, the first optical display and second optical display may be configured to use similar or different gradients depending on the requirements of each of the user's eyes. Progressive optic lenses could also be implemented in binocular HMD systems, thereby allowing the user to train both eyes on a single optical focal point.

Figure 3B:
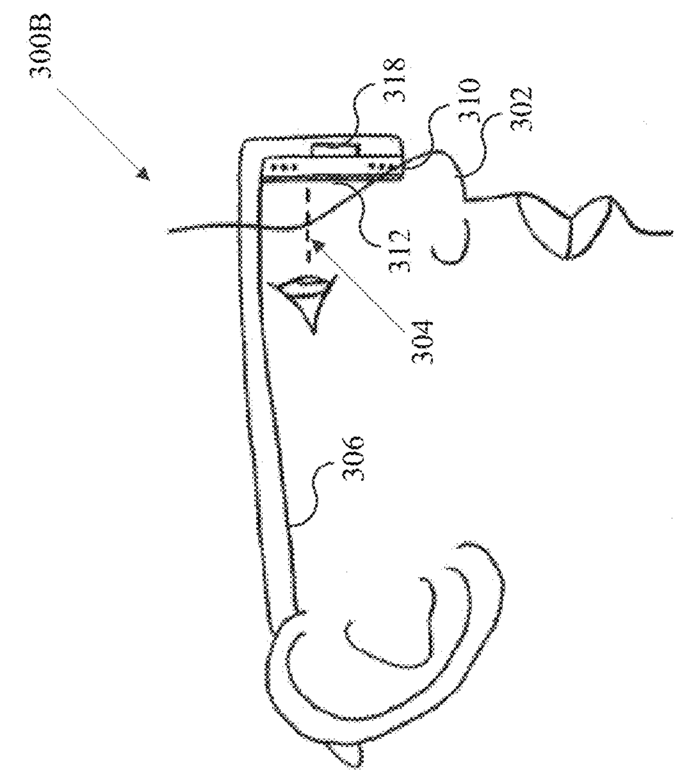
FIGS. 3A-B are side view representations of HMDs according to various embodiments.
Figure 3A:
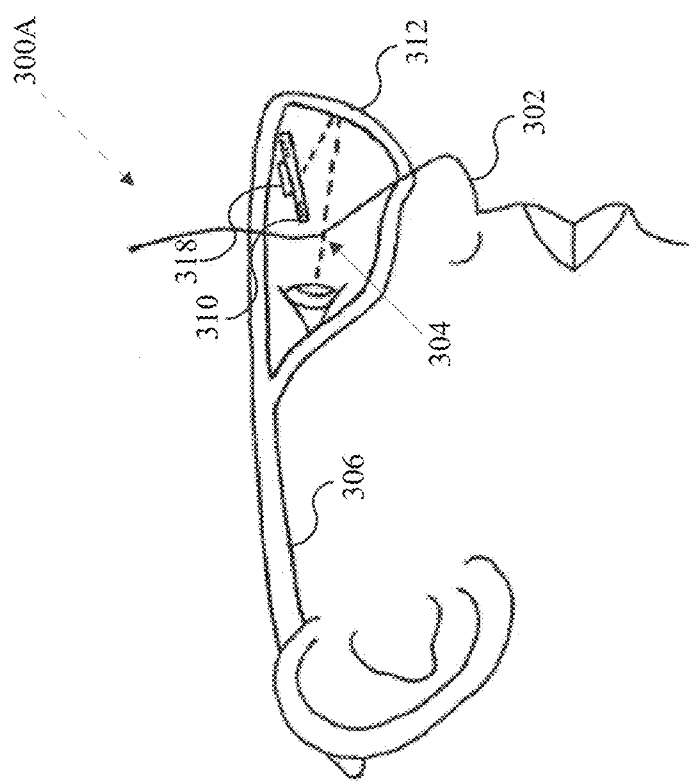

FIGS. 3A-B are side view representations of HMDs (e.g., HMD systems 200A, 200B of FIGS. 2A-B) according to various embodiments. An HMD system 300A can include a frame 306, an image display system 310, an optical surface display 312, and an electronics module 318. The frame 306 can be configured to be supported by the user's ears, while the bridge may be supported by the user's nose. In some embodiments, the image display system 310 emits light 304 that is reflected by an optical display surface 312 toward the user's eye(s). Thus, the light 304 (which forms a digital image) is reflected towards a user's eye(s) due to the projection of the image display system 310 towards an angled optical display surface 312. HMD system 300A may have a binocular or a monocular optical display configuration as described above. The electronics module 318 can control what digital content is projected by the image display system 310.

Similarly, HMD system 300B can include a frame 306, an image display system 310, an electronics module 318, and, optionally, an optical surface display 312. In some embodiments, the image display system 310 is configured to emit light 304 directly into the user's eye(s). When the light 304 is emitted toward the user's eye(s), the optical display surface 312 may be present only in select embodiments. The optical display surface 312 may be included in order to improve image quality in certain environments or for certain users, but may not be necessary depending on the arrangement of the image display system 310 and the optical display surface 312. The optical display surface 312 may not be required in some embodiments to redirect the light 304 emitted by the image display system 310. As described above, HMD system 300B may have a binocular or monocular optical display configuration. An electronics module 318 can process the digital content (e.g., virtual reality content, augmented reality content) projected by the image display system 310 to one or both of the user's eyes.

The image display system 310 of HMD systems 300A and 300B may be configured to project virtual reality content, augmented reality content, or both. In various embodiments, the optical display surface 312 is completely opaque, completely transparent, or semi-transparent depending on the type of digital content to be displayed, the intended viewing environment, etc. For example, the optical display surface 312 may be opaque for virtual reality applications, and transparent or semi-transparent for augmented reality applications. The optical display surface 312 could also be selected based on its reflective and/or transmissive properties.

Adjustable Overlap

Figure 4:
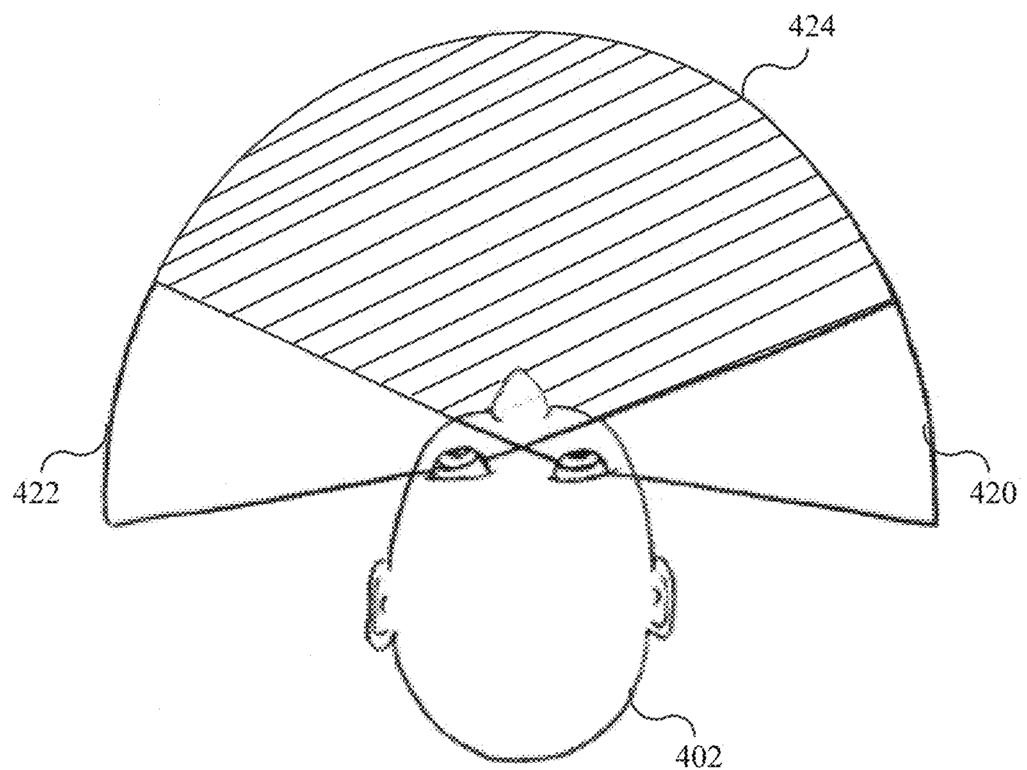
FIG. 4 is a diagram illustration of a left eye view, right eye view, and combined view showing overlap experienced by a user.

FIG. 4 is a diagram illustration of a left eye view, a right eye view, and combined view showing overlap experienced by a user 402. More specifically, FIG. 4 shows a user's field of vision broken into three categories: the area seen only by the user's right eye 420, the area seen only by the user's left eye 422, and the area seen by both of the user's eyes 424. The overlap is the portion of the left eye view and the right eye view that can be viewed simultaneously by both eyes of the user. Digital content displayed to the user of a binocular or combined HMD system, such as binocular HMD system 200A of FIG. 2A, can be presented with an overlap. Conventionally, the amount of overlap is predefined or restricted by the hardware components of the HMD. Embodiments described herein, however, incorporate hardware components and/or software modules that allow the overlap to be adjusted in real-time as digital content is being viewed by the user. The size of the overlap may vary based on a number of factors, including, but not limited to, system specifications, digital content properties, content type, application, hardware properties, and software properties (e.g., visual balancing parameters). In some embodiments, very precise modifications of the overlap can be made (e.g., on a pixel-by-pixel basis).

Overlap can vary based on several factors, including the perceived focal distance, the content type, and the application type. For example, close-range viewing may require a larger overlap, while long-range viewing may require a smaller overlap. HMD systems with small overlap generally require more visual effort by the user to fuse the two distinct images together.

In some embodiments, an HMD system is able to adjust the overlap of a first digital image presented to the user's left eye and a second digital image presented to the user's right eye based on the user's perceived focal distance and the content type. Perceived focal distance (also referred to as the "viewing distance") refers to the imagined distance between the user and the user's focal point within the virtual or augmented reality environment. The adjustment may take place in real time based on measurements and analysis of the eye movement and perceived focal distance of the user. The perceived focal distance of the user can be measured in a variety of ways, including an ultrasonic ranging system, eye and/or head position tracking, etc.

The HMD system can adjust the overlap by decreasing or increasing the number of pixels viewed by the user's left eye and/or right eye. For example, if pixel density increases at a central focal point (i.e., between left and right eyes), the overlap is likely to increase. The overlap adjustment methods described herein can be performed automatically by the HMD or manually (e.g., by an administrator associated with the HMD or a programmer/developer associated with the digital content). Automatic adjustments could also be made by an electronics module (e.g., electronics module 218 of FIG. 2A) that detects the display mode (i.e., binocular or monocular), the type (i.e., 2D or 3D content), the application (e.g., video, gaming, text, document, map), etc., of the digital content presented to the user and makes adjustments accordingly. Manual adjustments, meanwhile, could be made by the user using a tactile input sensor, providing a vocal command, etc.

As described above, the overlap presented by the HMD at a given point in time can be based on the perceived focal distance of the user. That is, the imagined distance between the user and the focal point of the user's eyes. In some embodiments, the amount of overlap is predetermined based on the measured focal distance. For example, an embodiment may support three viewing distances: close-range (45-55 cm); medium-range (70 cm-1 m); and long-range (>3 m). In some embodiments, the user may have the option of selecting one of the predetermined overlaps. The user's selection, which may provide a more comfortable viewing experience, can be based on the content type, display mode, application type, or some combination thereof. The user may be able to change the overlap in a variety of ways. For example, in some embodiments the user can use a vocal command as an input, while in other embodiments the user can perform a gesture using a hand, arm, leg, etc. The user could, for instance, present the palm of her hand to a sensor (e.g., camera) in order to select the close-range viewing distance and a first for long-range viewing distance. One skilled in the art will recognize that many vocal commands and gestures are possible as input commands. The HMD system can include one or more sensors (e.g., sensors 214 of FIGS. 2A-B) that are adapted to recognize the gestures and/or vocal commands of the user. Examples of possible gestures include tilting the head down for close-range view, tilting head up for long-range view, extending arm for long-range view, etc.

The overlap modification can also trigger a change in how digital content is presented to the user. For example, brightness, contrast, and input mode may change when a vocal command or gesture triggers a command input. Similarly, modifications to the overlap may cause an increase in peripheral presentation while reducing or eliminating central presentation. A modification may also occur when the user selects a different viewing mode. In some embodiments, the HMD modifies a user interface or makes other visual adjustments based on the user's eye movement and position (e.g., interpupillary distance). Additionally or alternatively, overlap modifications could be triggered by the user's motion (e.g., walking, running) and/or location (e.g., when in a moving vehicle or restaurant).

Touch-Based Content Management

Figure 5:
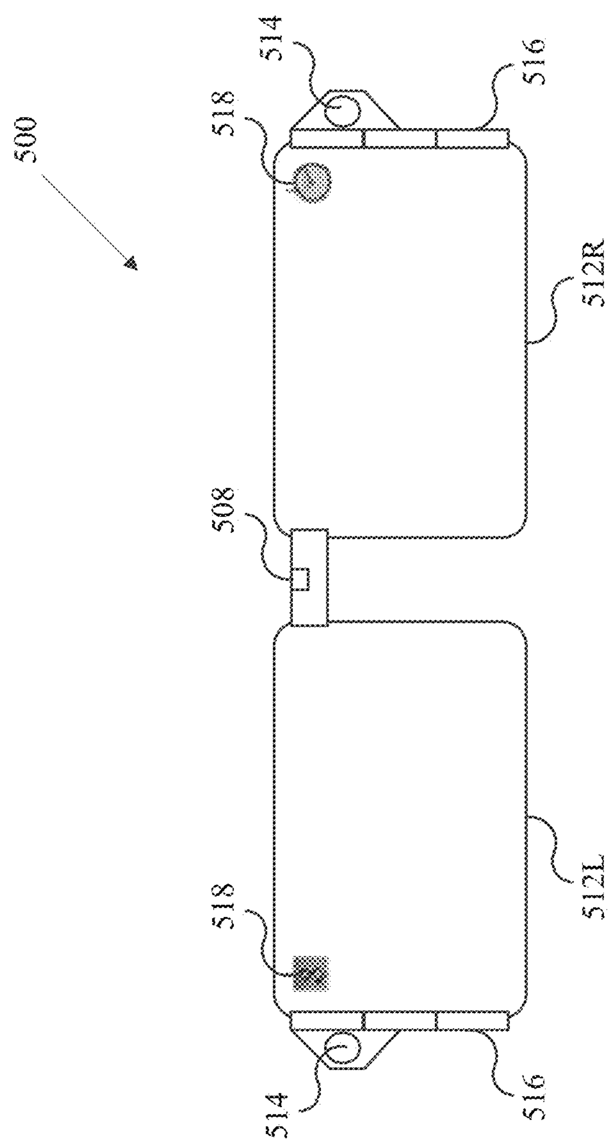
FIG. 5 is an inside view of an HMD that includes configurable icons.

FIG. 5 is an inside view of an HMD 500 that includes configurable icons 518. The HMD 500 includes a bridge 508, optical display surfaces 512L and 512R (collectively "optical display surface 512"), one or more tactile sensors 516, and icons 518. The bridge 508 may be supported by the user's nose to assist in stabilizing the HMD 500 and, as described above, the optical display surface 512 may display digital content to a user using a variety of different configurations. In some embodiments, the HMD 500 displays one or more icons 518 to the user. The icons 518 may allow the user to further interact with the local environment (e.g., by interacting with digital content related to the local environment), access information pertaining to the local environment (e.g., social media comments, restaurant reviews, directions), or receive notifications (e.g., personal email or text messages).

One or more tactile sensors 516 can be coupled to the frame that allow the user to modify what digital content is displayed on the optical display surface 512 or interact with the displayed content (e.g., icons 518). The one or more tactile sensors 516 can be integrated into the frame or coupled to the frame depending on the application. For example, the tactile sensor(s) 516 may be integrated into the frame if the HMD takes the same form as conventional eyeglasses. The tactile sensor(s) 516 may include piezoresistive sensors, piezoelectric sensors, capacitive sensors, electroresistive sensors, etc. The tactile sensor(s) 516 may also be implemented in a variety of ways, such as buttons, switches, touch screens, etc. In some embodiments, the tactile sensor(s) 516 include pressure-sensitive multi-touch sensors (i.e., 3D Touch) that allow the user to convey specific commands (e.g., slight pressure results in minor realignment of the digital content and more significant pressure causes major realignment of the digital content).

In some embodiments, the one or more tactile sensors 516 are used to modify the overlap displayed on the optical display surface 512. For example, pressure applied to a tactile sensor embedded within the frame near the user's left eye may modify the overlap for the user's left eye, while pressure applied to a tactile sensor embedded within the frame near the user's right eye may modify the overlap for the user's right eye. In some embodiments, the user is able to apply pressure to both sides of the frame to modify the overlap of both eyes. Generally, the tactile sensor(s) 516 are coupled to the outer edge of the frame and/or optical display surface 512. However, the tactile sensor(s) 516 could also be coupled inside the frame and/or optical display surface 512 nearer to the user's eyes. In some embodiments, the tactile sensor(s) 516 are embedded within the frame and/or optical display surface 512.

The HMD 500 may utilize gestures as input commands or as a means to modify the user interface. Gestures may include, for example, pushing the bridge 508 of the frame, applying pressure to the frame with one or both hands, and pushing the frame upward or laterally. The gestures can be used to modify the user interface or trigger a command input (e.g., select, zoom, modify overlap, modify resolution) for the HMD. These gestures could be used in both monocular and binocular HMD systems regardless of whether the HMD systems are configured to present augmented or virtual reality content.

The digital content displayed to the user may change depending on whether the HMD 500 is presenting augmented or virtual reality content. For example, an HMD 500 presenting augmented reality content may display digital imagery only in the user's peripheral area. The layout of the digital imagery may be a single icon, a column of icons, a collapsible table of icons, etc. In some embodiments, peripheral icons are designed (e.g., size, shape, brightness) such that the icons are easily detectable, but not clearly viewable in the user's peripheral area. For example, the icons 518 of FIG. 5 are located in the user's peripheral area. The brightness of these icons 518 could naturally be set to a low level and may increase if new information or an update becomes available to the user.

By applying pressure next to (or directly on top of) the peripheral icon 518, the user can interact with the icon 518. The intensity level and duration of the pressure may affect which action(s) are performed by the HMD (e.g., select the icon, push content into the user's visual field, hide the icon). Similarly, the force and duration of the pressure may trigger different input commands (e.g., zoom, modify overlap, modify resolution). For example, if the user applies pressure to a tactile sensor 516 next to the icon 518, the icon may move from the periphery towards the center of the optical display surface 512. If the user maintains contact with the tactile sensor 516, the icon 518 or its contents may remain stationary for the user to observe. If the user discontinues contact with the tactile sensor 516, the icon 518 may return to its original peripheral position. In some embodiments, the icon 518 returns to its original peripheral position when the user applies pressure to a tactile sensor 516 on the opposite side of the optical display surface 512. Generally, the HMD 500 can also distinguish between a single pressure point (e.g., one finger, one button) and multiple pressure points (e.g., multiple fingers, multiple buttons), which allows the HMD to recognize a greater number of user interface and input commands.

The icons 518 can notify the user in various ways, including an increase in brightness, movement of an existing icon, appearance by a new icon, etc. In some embodiments, the icon 518 moves into the middle of the user's field of view in response to a first pressure to a tactile sensor 516. If the user applies a second pressure to the tactile sensor 516, the icon 518 may return to its original peripheral location. In various embodiments, the effect of one or more user interactions (e.g., length, amount, and/or location of pressure applied) can be predefined and/or customized by the user (e.g., using an application, software program, or web-based interface associated with the HMD).

Customization may allow the user to modify the HMD 500 in order to better accommodate her viewing needs and improve the effectiveness of the HMD 500. The user may be able to customize various features, including the icon presentation, user interface layout, number of icons displayed, information to be displayed by the icons, etc. In some embodiments, different parts of the frame, bridge 508, and/or optical display surface 512 can be customized to trigger various user interface modifications and/or command inputs. For example, the bridge 508 may be configured to power on/off the HMD 500 when pressure is applied by the user.

In some instances, the virtual or augmented reality content to be displayed to the user requires an overlap that the HMD 500 is unable to provide (e.g., exceeds system capabilities). In order to avoid visual discomfort, the HMD 500 can switch from a binocular viewing mode to a monocular viewing mode (or vice versa) to more comfortably present the digital content. For example, the HMD 500 may elect to present content to only one eye by displaying the digital content on optical display surface 512L or optical display surface 512R. The amount of pressure applied by the user to a tactile sensor 516 may also be used for adjusting the viewing angle, resolution, etc., of the digital content displayed in the monocular or binocular viewing mode.

Lighting-Based Modification

In various embodiments, the HMD system 500 also includes a sensor 514 coupled to the frame and/or the optical display surface 512 to monitor various aspects of the user's local real world environment. The sensor 514 may be a camera configured to capture the user's interactions with the local environment, a light sensor configured to track illuminance levels within the local environment, an audio sensor configured to identify vocal commands, etc. In some embodiments, a plurality of sensors 514 are employed that serve as a light detection system, which measures the ambient light in the environment and/or any illumination directed towards the plurality of sensors 514. Based on the measured illuminance levels, the user interface (e.g., icon arrangement, size) and/or the input management of the HMD 500 can be modified. For example, the size of the icons 518 could be increased in low-light environments. These larger icons may require less precise finger tracking and input command detection (which may be necessary in certain lighting environments that prevent certain detection systems, such as infrared, from operating properly). Similarly, the brightness, color, background, etc., of the user interface and any digital content displayed on the optical display surface 512 can be modified in response to the measured illuminance levels.

In some embodiments, the HMD 500 alerts the user to use alternative input command gestures based on the illuminance levels measured by the light detection system. The HMD system 500 can, for example, be adapted to warn the user of potential tracking and gesture detection issues in low-light environments. The HMD system 500 could also be adapted to switch to an alternative command input and/or user interface system based on the measured illuminance level. For example, in bright light environments, the HMD system 500 can limit the number of trackable gestures and allow only a subset of predefined gestures.

In various embodiments, the measured illuminance level can affect the overlap of the digital content presented to the user, the fusional stabilization level, the content mode (e.g., 2D, 3D) displayed to the user, the display mode (e.g., binocular, bi-ocular, monocular) of the HMD system 500, or any combination thereof.

Figure 12:
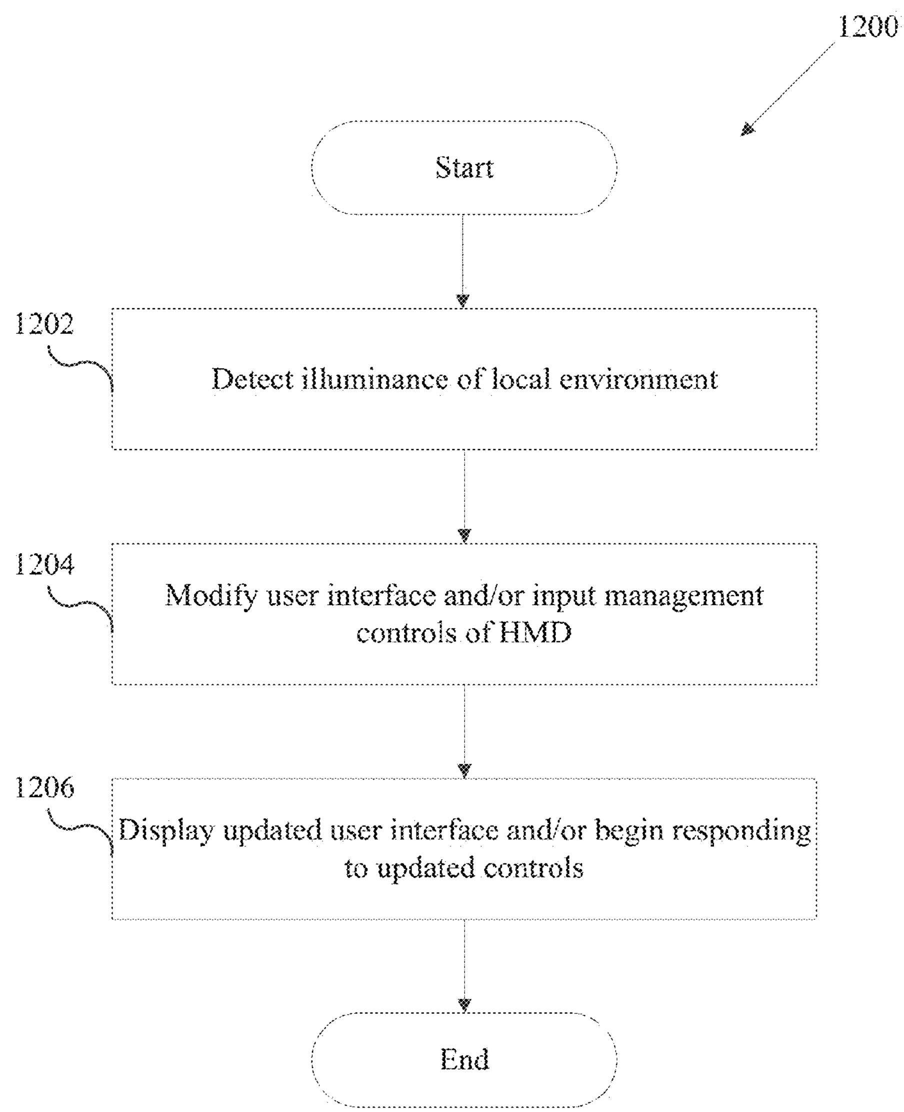
FIG. 12 is a flowchart of a process for modifying an interface and/or updating the controls for an input management system as may occur in some embodiments.

FIG. 12 is a flowchart of a process 1200 for modifying an interface and/or updating the controls for an input management system as may occur in some embodiments. Conventionally, infrared tracking systems are used to monitor and identify gestures performed by a user to interact with digital content presented by an HMD. However, infrared tracking systems are generally only effective in a small sub-set of lighting environments and are largely ineffective in atypical lighting environments, such as bright-light outdoor environments. Various embodiments described herein overcome these problems by modifying the user interface and/or input management system of the HMD based on the illuminance levels of the local environment.

At step 1202, the HMD detects the ambient illuminance (e.g., using sensors coupled to the frame of the HMD) of the local environment. At step 1204, the user interface and/or input management controls of the HMD are modified based on the ambient illuminance levels. For example, icons that compose the user interface may be enlarged to account for less accurate gesture identification. The controls of the HMD could also be modified if the HMD determines a first set of management controls is no longer appropriate. For example, the HMD may require that commands be provided via audible comments or touch-based commands (e.g., using buttons on the frame of the HMD), rather than gestures. At step 1206, the updated user interface is presented to the user and/or the updated input management system is implemented by the HMD.

Animated Augmented Content

A major challenge for augmented reality systems is correct superimposition of digital content onto a 3D real world environment, particularly in response to constantly changing fixation distances. Superimposing digital content onto 3D real world content requires accurate measuring and analyzing of the actual distance of the real world object, the perceived distance of the digital content, camera calibration, eye gaze movement, and head positioning (among other factors). The HMDs described herein can use animated digital content to simulate a change of distance in augmented reality systems. Various properties (e.g., convergence, brightness) of the animated digital content can be modified to more accurately imitate the change in the user's focal distance. For example, at close ranges the digital content may increase in size and appear closer to the eyes of the user, thereby increasing the convergence and demand. At longer ranges the digital content may decrease in size and appear farther away from the eyes of the user, thereby reducing the convergence and demand.

In some embodiments, the animation of the digital content can be triggered and/or controlled by the user. For example, the user may present a hand gesture, apply pressure to the frame, voice a command, tilt her head down, etc., in order to view the animated digital content at a closer (or farther) distance. The user may also present a hand gesture, voice a command, etc., to adjust and/or superimpose the digital content on a specific location relative to the 3D real world environment (e.g., on top of a targeted object). In some embodiments, the user is able to move and/or modify a plurality of digital images, or distinct parts of a single digital image, simultaneously in order to provide more accurate depth perception.

Vision Stabilization

Figure 6A:
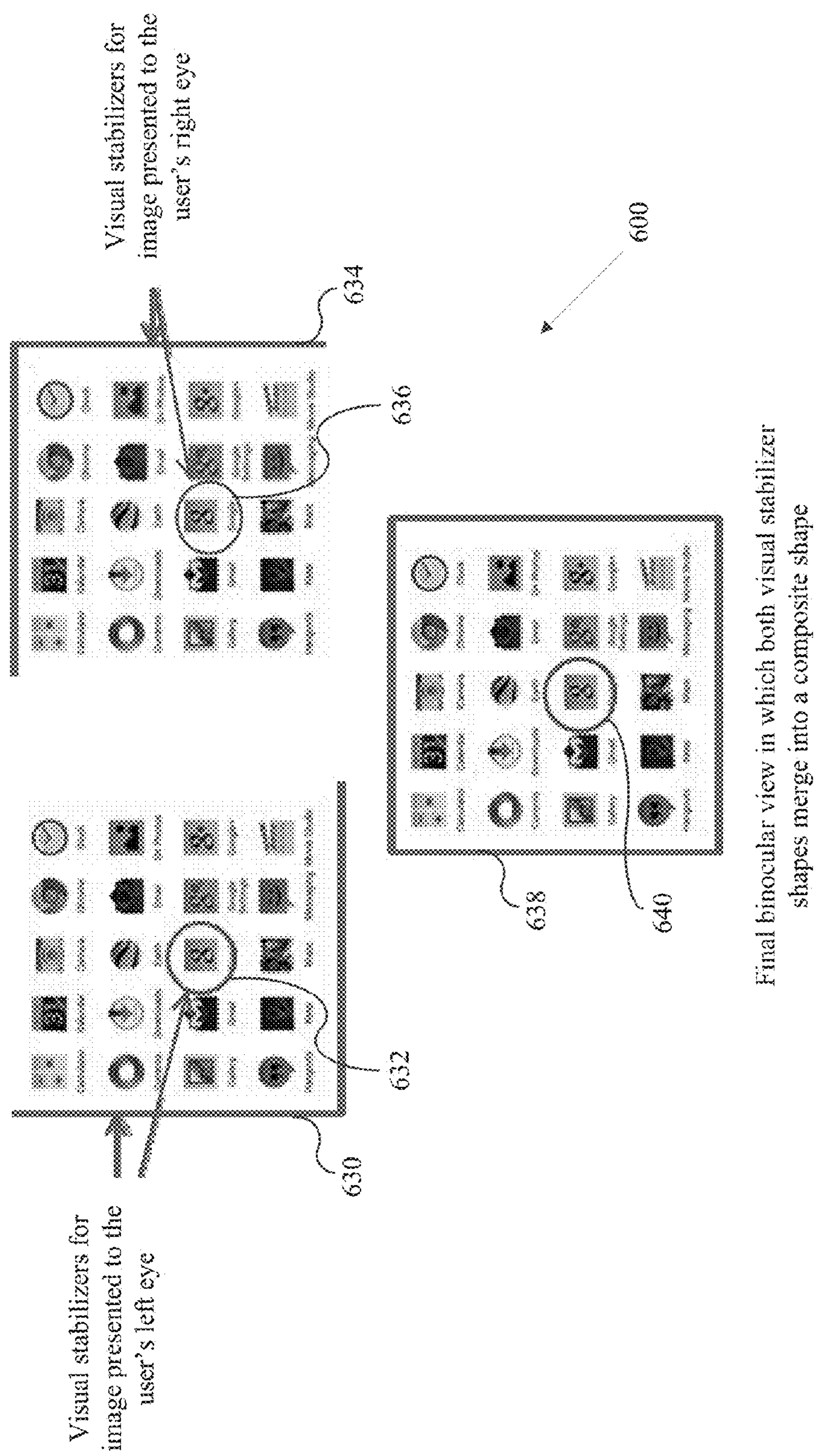
FIGS. 6A-C depict how visual stabilizers can be used to readily and effectively merge distinct digital images into a single composite image.
Figure 6B:
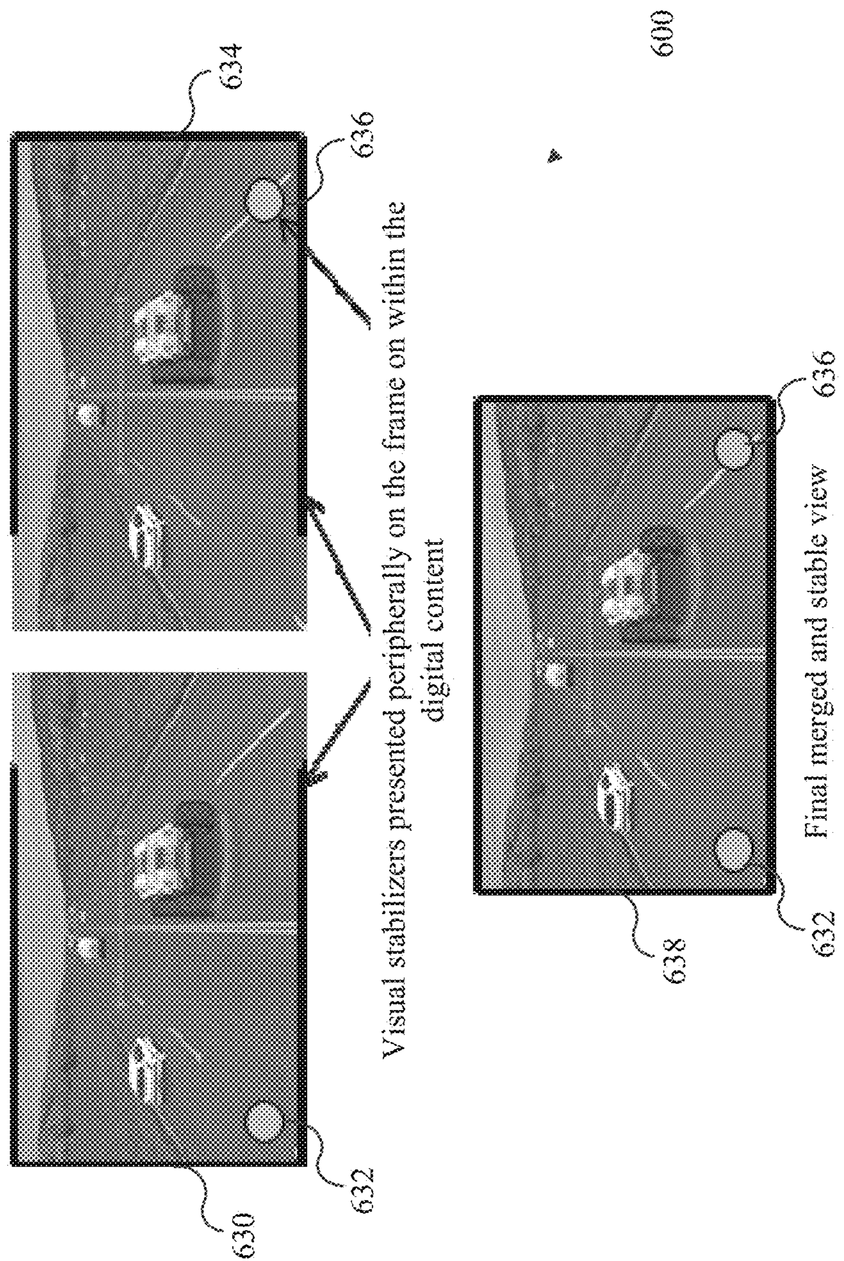
Figure 6C:
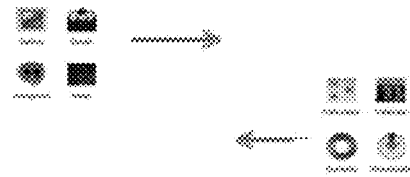
Figure 6C:
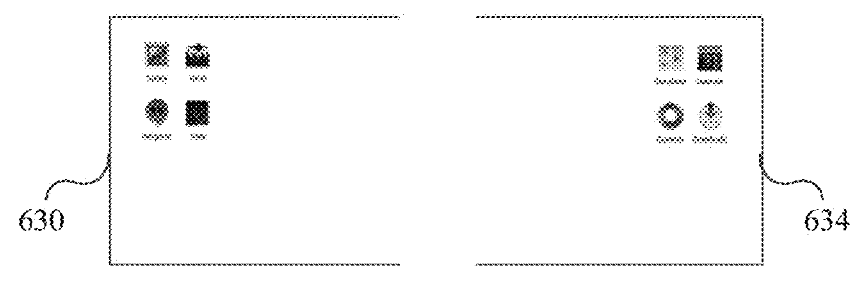

FIGS. 6A-C depict how visual stabilizers can be used to readily and effectively merge distinct images into a single composite image. Once visual stabilizers have been generated, they can be integrated into the digital content to be shown to the user (e.g., by superimposing the visual stabilizers on top of the digital content). Visual stabilizers can be used to improve a variety of issues that plague users of HMDs, including the fatigue experienced because there is no change in focal distance. The visual presentation system 600 presents one or more visual stabilizers to each eye that are merged together in binocular view to create a strong fusional system. The strong fusional system allows the user to merge and maintain the two separate images that have a small amount of overlap without visual discomfort. Moreover, a strong fusional system allows visual discomfort to be lessened (or eliminated entirely) by reducing the negative effects, such as eye strain, typically associated with viewing two different digital images simultaneously (e.g., by more accurately aligning the images). When digital content is presented by an HMD that has a large amount of overlap, the fusional system need not be as strong (e.g., because so many visual elements are shared between the two images).

The visual presentation system 600 can include a plurality of visual stabilizers that are added to the digital content presented to each eye of the user. The visual stabilizers provide visual cues that help the user merge or "lock" the images together. Generally, if the digital content presented to each of the user's eyes is similar or identical, fewer visual stabilizers are used because the digital content can be more easily merged together by the user. For example, the visual stabilizers may be a first outer frame 630 and a first inner focal point 632 presented in one image, and a second outer frame 634 and a second inner focal point 636 presented in another image. These visual stabilizers could be added to the digital content during development or added to pre-existing content (e.g., web pages, text messages, games, maps, videos, pictures) capable of being displayed on an optical display surface. In some embodiments, the visual stabilizers are distinct geometric shapes that are integrated into the digital content. Additionally or alternatively, elements already or naturally present in the digital content (e.g., icons, elements of a user interface) may be used as visual stabilizers. Such visual stabilizers may be indistinguishable from the rest of the digital content by the user.

As shown in FIG. 6A, the plurality of visual stabilizers can be merged together in binocular view to create a single fused image in which the visual elements are properly aligned when viewed to the user. The fused image may, for example, include a fused outer frame 638 created by combining the first outer frame 630 and second outer frame 634, and a fused inner focal point 640 created by combining the first inner focal point 632 and second inner focal point 636. Although the first outer frame 630 and second outer frame 634 are depicted as portions of a frame, they could also each be a complete frame that overlay one another when viewed simultaneously. Partial shapes may be used to help identify instances of eye fatigue and/or be performed as part of an anti-suppression technique (e.g., performed on the non-dominant eye). The visual stabilizers can be located in the peripheral areas of the digital image or in a more central location nearer the user's focal point. Visual stabilizers that are easily visible (e.g., larger geometric shapes, thicker frames, brighter coloration) are often preferred because the user is able to more readily recognize and merge the visual stabilizers. However, there may be instances, such as video games or movies, where more inconspicuous visual stabilizers are preferable.

In some embodiments, the plurality of visual stabilizers fuse to a shared location. For example, the first inner focal point 632 and the second inner focal point 636 may converge on the same icon as shown in FIG. 6A. In other embodiments, the plurality of visual stabilizers may be mapped to different locations. Visual stabilizers that map to different locations (e.g., peripheral areas of the user's vision) may be preferred when the user suffers from suppression-related issues. For example, the first inner focal point 632 and the second inner focal point 636 of FIG. 6B are placed in distinct locations of the digital content. The visual stabilizers could also affect the amount of overlap presented by the HMD and/or vary based on the amount of overlap shown by the HMD.

Visual stabilizers can be integrated into digital augmented or virtual reality content at various stages of development. For example, visual stabilizers may be integrated while digital content is being created through the use of software development kits (SDKs). The SDK can include one or more application program interfaces (APIs) for adding visual stabilizers to digital content. The APIs may include a number of function modules for implementing various interface functions (e.g., overlap variation, user interface modification). Pre-coded instructions for these various interface functions can also be provided to implement these interface functions in combination with pre-existing digital content.

As described above, visual stabilizers can be used with augmented reality content, virtual reality content, and mixed (i.e., some combination of augmented and virtual reality) content. In some embodiments the visual stabilizers are placed in retinal correspondence areas, while in other embodiments the visual stabilizers are placed in retinal non-correspondence areas. Retinal correspondence areas are those areas that include elements focused on by the user's two eyes that share a common subjective visual direction (i.e., a common visual direction).

Various properties of the visual stabilizers may change based on the characteristics of the viewing experience. These properties include, but are not limited to, size, number, shape, position, color, brightness, and contrast. For example, the visual stabilizers may typically be a circle, an ellipse, a triangle, any other quadrilateral, a line (or combination of lines), etc. Meanwhile, the viewing characteristics that prompt the change could include the current size of the overlap shown to the user, whether the digital content is augmented or virtual reality content, the type of digital content (e.g., movies, video games), the type of optics used in the HMD, the age of the user (e.g., older users may require additional visual stabilizers), whether the user has any known eye problems, whether the user requires corrective glasses or contact lenses, the time of day (e.g., fatigue increases later in the day), ambient light levels (e.g., brighter visual stabilizers in outdoor viewing environments), etc. The visual stabilizers may also be temporary (e.g., only used to initially align the images) or permanent. Visual stabilizers could be added as (or after) the eyes become tired. For example, visual stabilizers may be added to digital content after a certain time period (e.g., additional visual stabilizers every 30 minutes) or after receiving a user input (e.g., user interacts with the HMD and specifies that she is experiencing eye fatigue). In some embodiments, the visual stabilizers are animated elements of the digital content.

In embodiments having a plurality of visual stabilizers, the visual stabilizers may be related and could vary based on the content type, application, mode (e.g., 2D or 3D), local environment, user movement, position/orientation of the user's head, position of the user's eyes, etc. As shown in FIGS. 6A-C, the visual stabilizers are placed around the digital content as visual frames in some embodiments. For example, a fused outer frame 638 can form an outer border that surrounds the digital content. A visual frame may be a complete or partial segment of any geometric shape (e.g., rectangle, circle, line) that surrounds the digital content displayed to the user. As the user views the displayed content with both eyes, the visual frames merge, thereby creating a fully fused and stable visual frame. The properties of the visual frame, such as size, thickness, and length, can vary based on a number of factors, including, but not limited to, overlap size, perceived distance, and application. In some embodiments, the digital content is modified (e.g., shifted left/right or up/down) after determining the spatial relationship between the visual stabilizers does not match an expected relationship (e.g., arrangement). The modification could also be a change in orientation or position of the digital content, total pixel count, the overlap of the digital images, etc.

Peripheral visual stabilizer can be used for presenting a plurality of different digital contents in the peripheral region of each eye of a user. For example, FIG. 6C shows a presentation of two different contents in the user's peripheral vision with no overlap.

One or more properties of the visual stabilizer can also be changed before or during use (i.e., viewing of the digital content). For example, a frame (e.g., fused outer frame 638) could be set to a predetermined width for each of a plurality of users, such that digital content viewed by a first user implements a first width, digital content viewed by a second user implements a second width, etc. In some embodiments, properties of the visual stabilizer are modified while the user is viewing the digital content. For example, the width of a frame (e.g., fused outer frame 638) may increase proportional to the duration of use. Similarly, the brightness of one or more visual stabilizers may increase proportional to the duration of use or the amount of ambient illumination. In some embodiments, additional visual stabilizers are added while the user is viewing the content. For example, additional clouds, trees, etc., may be added to the digital content (e.g., 3D virtual environment) over time to decrease the viewing fatigue experienced by the user, which typically affects the user's ability to properly fuse the two images together (i.e., the user's fusional system).

An HMD system may be configured to implement visual stabilizers that are personalized for the user. The personalization can be based on the application, content type, length of use, a user's visual impairment (e.g., myopic, hyperopic, diplopia, color blindness), or any of the other viewing characteristics described above. For example, a plurality of visual stabilizers (e.g., fused outer frame 638, fused inner focal point 640) having high resolution and strong contrast might be shown to a first user who has pre-existing visual impairments, while a single visual stabilizer (e.g., fused outer frame 638) might be shown to a second user who has no visual impairments. The single visual stabilizer may be one of the plurality of visual stabilizers shown to the first user or another distinct visual stabilizer. Similarly, a plurality of visual stabilizers shown to a first user can be different than those shown to a second user. For example, a first series of visual stabilizers (e.g., fused outer frame 638, fused inner focal point 640) could be shown to a first user, and a different second series of visual stabilizers (e.g., trees, clouds) could be shown to a second user. Animated and/or temporary visual stabilizers that are only viewable for a limited amount of time could also be personalized for the user (e.g., visual stabilizers may be presented to users who have visual impairments or who have used the HMD for an extended period for a longer period). The personalization can be implemented manually (i.e., directed by user input) or automatically based on content type, length of use, etc.

High-Resolution Perception

Figure 7:
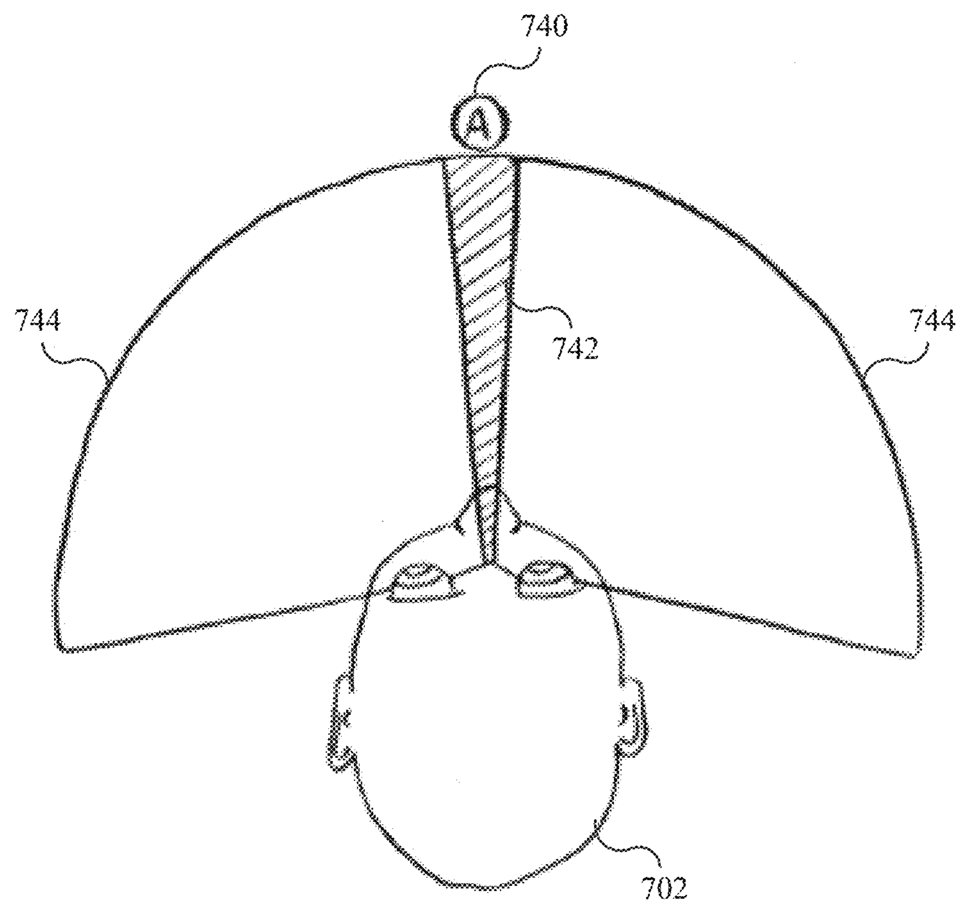
FIG. 7 is a diagram illustration of a user's high resolution and low resolution viewing fields.

FIG. 7 is a diagram illustration of a user's high resolution and low resolution viewing fields. As further described below, some embodiments described herein improve the perception and image stability of HMDs by increasing resolution in a particular area of the digital content displayed to the user 702. When the user 702 trains her eyes on a focal point 740 in a real-world environment, a high resolution field of view 742 and a low resolution field of view 744 are created. The high resolution field of view 742 is limited in area and generally is approximately 2 degrees. Various embodiments herein emulate these natural fields of view by increasing resolution in certain areas in a digital image, while decreasing resolution in other areas.

Figure 8:
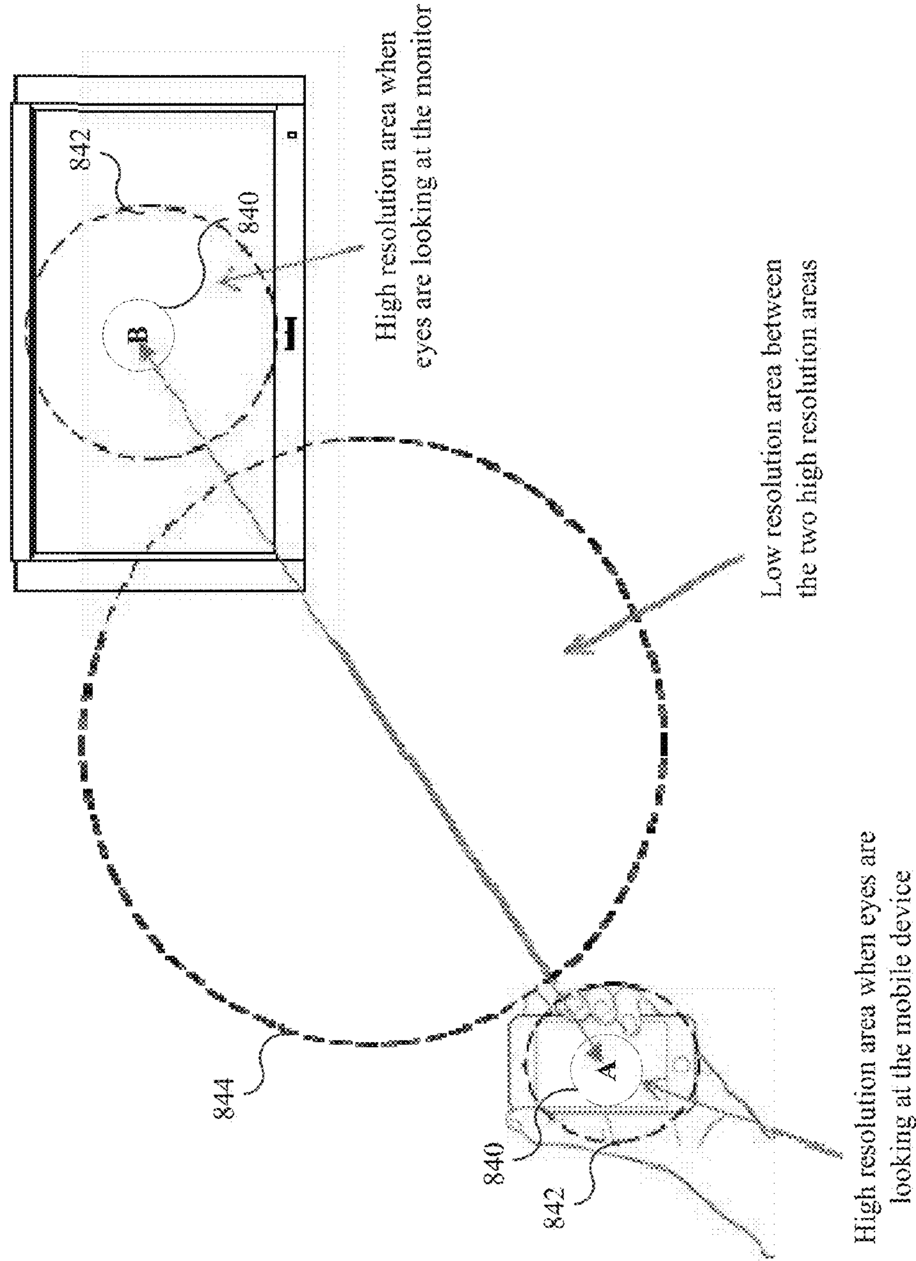
FIG. 8 depicts a user's high resolution and low resolution viewing fields in a single instance.

FIG. 8 depicts a user's high resolution viewing fields 842 and low resolution viewing fields 844 in a single instance. As described above, when the user trains her eyes on a focal point 840, a high resolution field of view 842 and a low resolution field of view 844 are created. If the user trains her eyes on a plurality of focal points in succession (e.g., focal points A and B), a low resolution field of view 844 will be created between those focal points.

Figure 9:
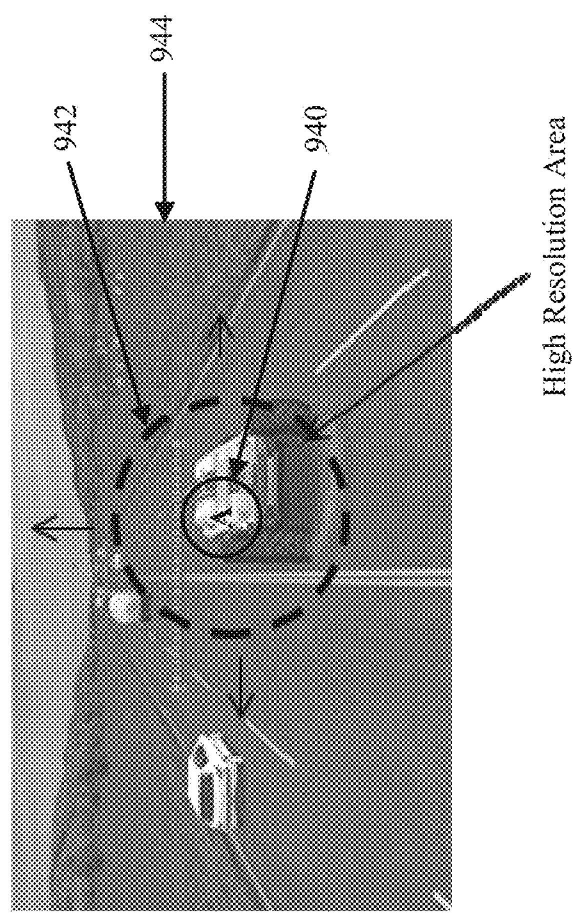
FIG. 9 is an illustration of high resolution and low resolution viewing areas in a digital image presented by an HMD.

FIG. 9 is an illustration of high resolution and low resolution viewing areas in a digital image presented by an HMD. The digital image of FIG. 9 includes a focal point 940 that is the subject of a user's gaze, a high resolution area 942 surrounding the focal point 940, and a low resolution area 944 that encompasses the remainder of the digital image. The HMD system can vary the resolution of the digital content displayed to a user based on various criteria, such as the speed and direction of the user's head and/or eye movements. In some embodiments, the HMD displays digital content having a higher resolution in an area 942 near or around the focal point 940 of the user's eyes. The remaining area of the digital content may be displayed in a lower resolution. These techniques more accurately mimic the resolution naturally experienced by the user's eyes (i.e., high resolution only where the user's gaze is actually focused). In some embodiments, the size of the high resolution area 942 varies based on the speed of the user's head or eye movements.

Adjustments to the resolution of the digital content can be made by an electronics module (e.g., electronics module 218 of FIGS. 2A-B). The electronics module may employ predictive algorithms (or other forms of machine learning) to better predict the adjustments likely to be necessary for particular users and/or types of digital content. For example, in some embodiments these algorithms monitor the user's head movement to predict which area(s) of the digital content should have a high resolution at a certain time, while in other embodiments these algorithms analyze the digital content itself to determine where a user is likely to look (e.g., a particular location on the display when playing a video game) at a certain time. The adjustments generally take place in real time.

In some embodiments, the resolution of the peripheral area increases or decreases relative to the speed and direction of the user's head or eye movements. When the user's eyes move from a first focal point to a second focal point (e.g., focal points A and B of FIG. 8), the resolution of the digital content between the two focal points may be reduced. The reduction can be proportional to the speed of the user's head or eye movements. For example, the resolution may decrease when the speed of user's head and/or eye movement increases. The reduction can also be based on the direction of the user's head or eye movement (e.g., resolution decreases when the user's head is tilted downward and increases when the user's head is tilted upward). Similarly, the resolution may increase as the speed of the user's head and/or eye movement decreases, which may indicate the user is attempting to focus on an element of the digital content. In some embodiments, the HMD system is configured to display the maximum resolution across the entirety of the digital content (or some portion thereof) when there is no movement by the user's head and/or eyes. The high resolution area 942 preferably moves within the bounds of the digital content according to where the user's gaze is focused. Movement of the high resolution area 942 can depend on tracking of speed and direction of the user's head or eye movement by the HMD system. However, in some embodiments the high resolution area 942 is fixed in a predetermined location.

Figure 11:
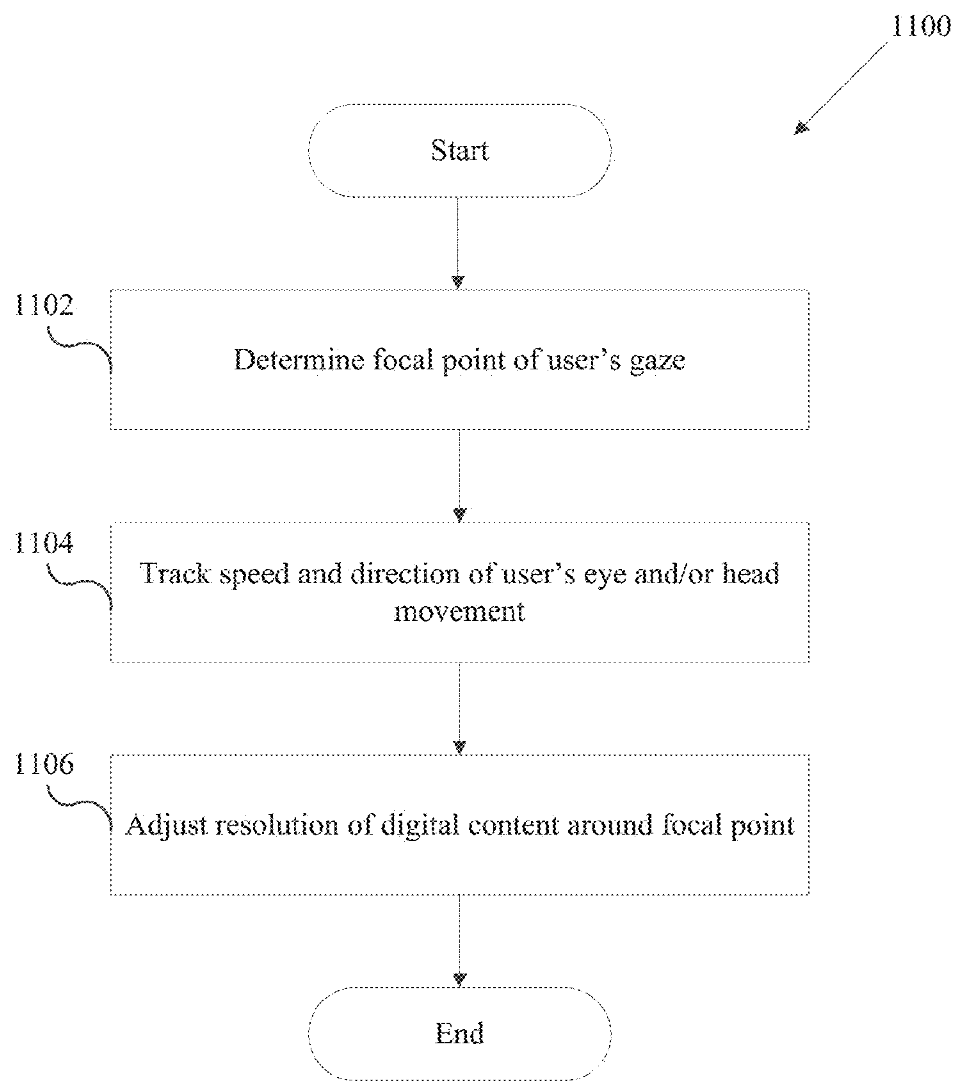
FIG. 11 is a flowchart of a process for adjusting display resolution by the HMD as may occur in some embodiments.

FIG. 11 is a flowchart of a process 1100 for adjusting display resolution by the HMD as may occur in some embodiments. In some embodiments, the HMD is adapted to modify the resolution of digital content presented to the user in real-time. At step 1102, the HMD determines the focal point of the user's gaze. This can be done by identifying certain gestures (e.g., pointing) or by tracking the speed and direction of the user's eye and/or head movement, as shown at step 1104. At step 1106, the resolution of the digital content is adjusted around the focal point. Typically, the HMD will increase the resolution in an area around or near the focal point, and decrease the resolution everywhere else in the digital image.

Multi-Distance Optical System

Figure 10:
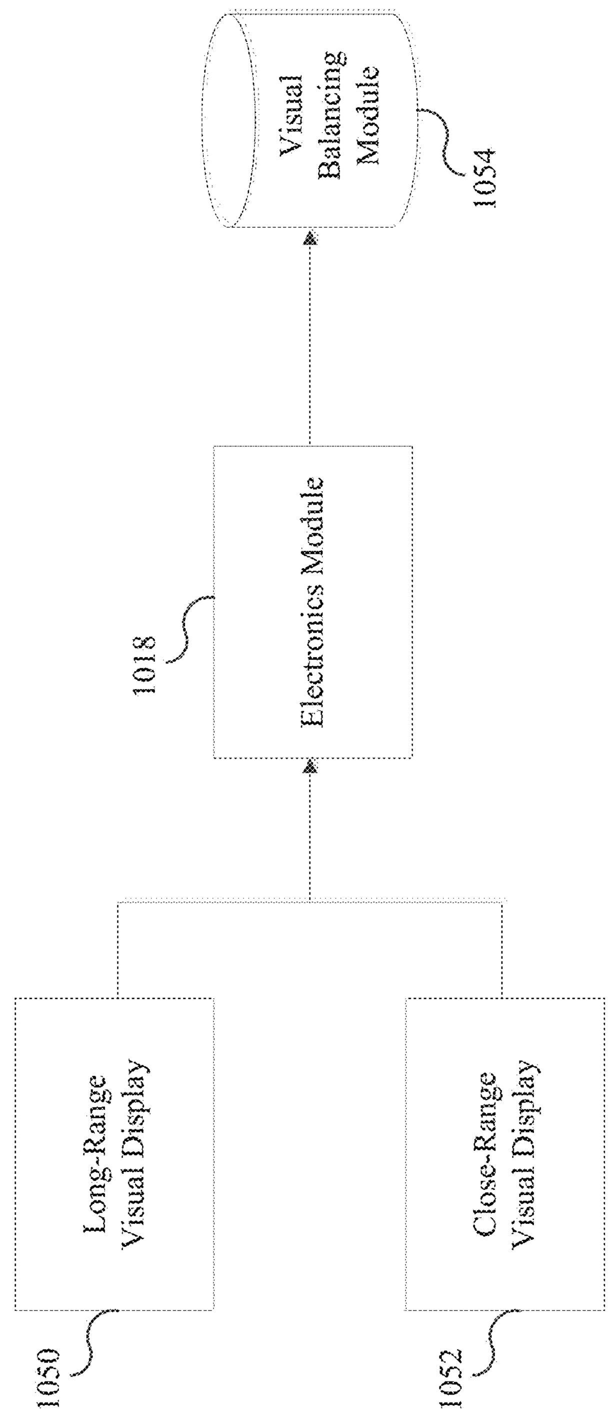
FIG. 10 is a diagram illustration of a method for displaying digital content over a range of focal distances.

FIG. 10 is a diagram illustration of a method for displaying digital content over a range of focal distances. As described above, some HMDs include a first optic 1052 configured to present digital content up to a predetermined distance away, and a second optic 1050 configured to present any digital content whose distance exceeds the predetermined distance. For example, the first optic 1052 may be configured to present content for close-range viewing, while the second optic 1050 may be configured to present content for long-range viewing. Such an HMD can also include an electronics module 1018 that includes or is communicatively coupled to a visual balancing module 1054. The visual balancing module 1054 can use a fusional stabilizer system to balance the two distinct images displayed on the first optic 1052 and the second optic 1050. The visual balancing module 1054 can also output a fused composite image to be shown to a user on, for example, an optical display surface of an HMD.

Computer System

Figure 15:
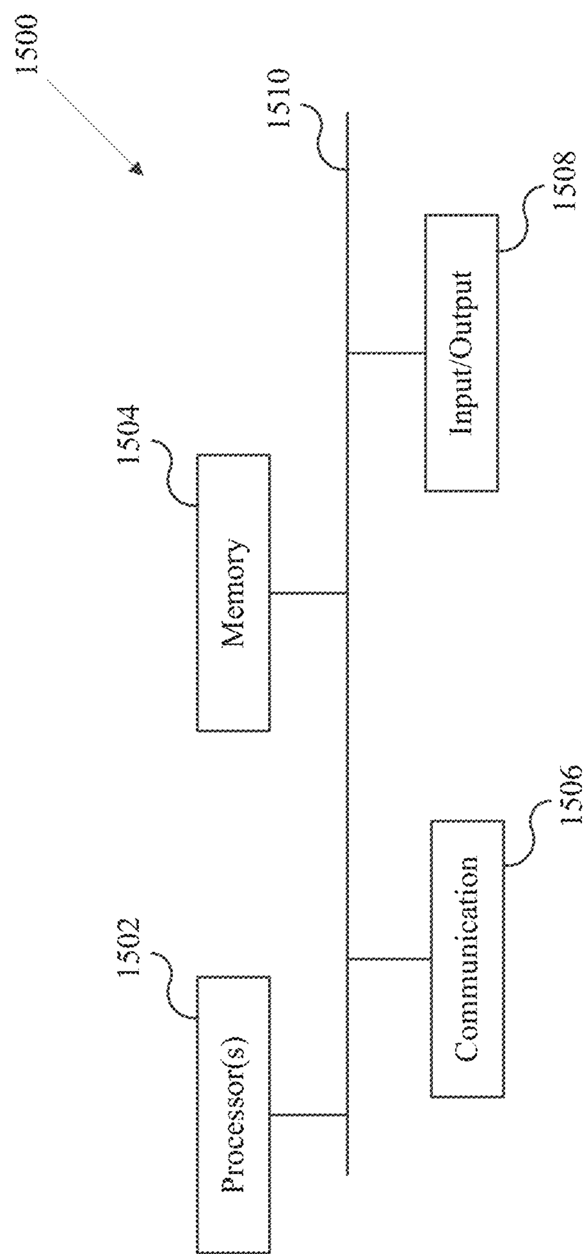
FIG. 15 is a block diagram illustration an example of a processing system in which at least some operations described herein can be implemented, consistent with various embodiments.

FIG. 15 illustrates a block diagram of a computer system that may be used to implement certain features of some of the embodiments described herein. The computer system 1500 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 1500 may include one or more central processing units ("processors") 1502, memory 1504, a communication device 1506, and an input/output device 1508 (e.g., keyboard and pointing devices, touch devices, display devices) that are connected to an interconnect 1510.

The interconnect 1510 is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also referred to as Firewire.

The memory 1504 is any computer-readable storage media that stores instructions that implement at least portions of the various embodiments described herein. In addition, the data structures and message structures may be stored or transmitted via a data transmission medium (e.g., a signal on a communications link). Various communications links may be used, such as the Internet, a local area network, a wide area network, or a point-to-point dial-up connection. Thus, computer readable media can include computer-readable storage media (e.g., non-transitory media) and computer-readable transmission media.

The instructions stored in memory 1504 can be implemented as software and/or firmware to program one or more processors 1502 to carry out the actions described above. In some embodiments, such software or firmware may be initially provided to the processor 1502 by downloading it from a remote system through the communication device 1506 (e.g., Ethernet adapter, cable modem, Wi-Fi adapter, cellular transceiver, Bluetooth transceiver).

The various embodiments introduced herein can be implemented by, for example, programmable circuitry (e.g., one or more microprocessors), programmed with software and/or firmware, entirely in special-purpose hardwired (i.e., non-programmable, circuitry), or in a combination of such forms. Special-purpose hardwired circuitry may be in the form of, for example, one or more ASICs, PLDs, FPGAs, etc.

The computing system 1500 may be communicatively coupled to the electronics module (e.g., electronics module 218 of FIG. 2A-B) or the HMD. The digital content modification, image processing, and/or data analyzing techniques described herein can be accomplished solely by the computing system 1500 or shared between the computing system 1500 and the electronics module. In some embodiments the computing system is physically coupled to the HMD, while in other embodiments the computing system may communicate with the HMD and/or electronics module wirelessly (e.g., via Bluetooth or Wi-Fi).

In addition to the above mentioned examples, various other modifications and alterations of the invention may be made without departing from the invention. The language used in the Detailed Description has been principally selected for readability and instructional purposes, and it may not have been selected to delineate or circumscribe the inventive subject matter. Accordingly, the above Detailed Description is not to be considered as limiting and the appended claims are to be interpreted as encompassing the true spirit and the entire scope of the invention.

What is claimed is:

1. A system for generating and implementing visual stabilizers that serve as visual cues for a user of a binocular head-mounted device and that allow digital content to be more easily visually fused by the user, thereby decreasing eye fatigue experienced by the user over time, the system comprising:

a processor communicatively coupled to an image display system of a head-mounted device and a memory, the processor operable to execute instructions stored in the memory; and the memory, which includes specific instructions for generating visual stabilizers that are presented within digital content viewable by a user on a first optical display surface and a second optical display surface of the head-mounted device, wherein the specific instructions cause the processor to:

generate a first visual stabilizer that is a first digital representation of at least part of a geometric shape;

integrate the first visual stabilizer into a first digital image to form a first composite image, the first composite image to be shown to one of the user's eyes;

cause the first composite image to be presented on the first optical display surface;

generate a second visual stabilizer that is a second digital representation of at least part of the geometric shape;

integrate the second visual stabilizer into a second digital image to form a second composite image, the second composite image to be shown to the user's other eye; and cause the second composite image to be presented on the second optical display surface, where the first and second visual stabilizers are positioned within the first and second composite images, respectively, so that the first and second visual stabilizers substantially overlay one another when simultaneously viewed by the user, thereby decreasing an effort required to visually fuse the first and second composite images together.

2. The system of claim 1, wherein the specific instructions further cause the processor to:

determine whether the first and second composite images are projected on the first and second optical displays, respectively, such that the first and second visual stabilizers substantially overlay one another when the first and second composite images are viewed simultaneously by the user; and upon determining that the first and second visual stabilizer do not substantially overlay one another, make a modification to the projection of the first composite image, the second composite image, or both.

3. The system of claim 2, wherein the modification includes a shift left, right, up, down, or some combination thereof.

4. The system of claim 1, wherein the image display system includes a first image display system configured to project the first composite image toward the first optical display surface and a second image display system configured to project the second composite image toward the second optical display surface, and wherein the processor and memory are housed within the head-mounted device.

5. The system of claim 1, wherein the processor and the memory are communicatively coupled to the head-mounted device via a wireless connection across a network.

6. The system of claim 1, wherein the first and second visual stabilizers are integrated into a user interface presented within the first and second digital images, and wherein the first and second visual stabilizers are indistinguishable from other elements of the user interface by the user.

7. The system of claim 1, wherein the first and second visual stabilizers converge to a shared location when the first and second composite images are simultaneously viewed and visually fused together by the user.

8. The system of claim 1, wherein the first and second visual stabilizers are located in different locations and are visually distinct from one another when the first and second composite images are simultaneously viewed by the user.

9. The system of claim 8, wherein the first and second visual stabilizers form a complete representation of the geometric shape when the first and second composite images are simultaneously viewed by the user, and wherein the complete representation of the geometric shape is a frame that surrounds the first and second composite images.

10. The system of claim 1, wherein the first visual stabilizer is one of a first plurality of visual stabilizers generated by the processor and integrated into the first digital image and the second visual stabilizer is one of a second plurality of visual stabilizers generated by the processor and integrated into the second digital image.

11. The system of claim 10, wherein the first and second pluralities of visual stabilizers increase in count as an overlap portion of digital content that is shown within each of the first and second digital images decreases.

12. The system of claim 10, wherein at least one of the first plurality of visual stabilizers and at least one of the second plurality of visual stabilizers converge to a shared location, and wherein at least one of the first plurality of visual stabilizers and at least one of the second plurality of visual stabilizers are located in different locations when the first and second composite images are simultaneously viewed by the user.

13. A method for generating and implementing visual stabilizers that serve as visual cues for a user of a head-mounted device and that allow digital content seen by each of the user's eyes to be more easily visually fused by the user, the method comprising:

identifying a visual stabilizer from a plurality of visual stabilizers based on a characteristic of a user of a head-mounted device or of digital content to be viewed on the head-mounted device;

generating a first composite image that includes a first instance of the visual stabilizer and a first digital image;

generating a second composite image that includes a second instance of the visual stabilizer and a second digital image; and simultaneously presenting the first composite image and the second composite image to the user on the head-mounted device, where the first and second instances of the visual stabilizer are positioned within the first and second composite images so that the first and second instances of the visual stabilizer converge to a shared location when the first and second composite images are viewed by the user, thereby decreasing a visual effort required to visually fuse the first and second composite images.

14. The method of claim 13, wherein the characteristic is selected from:

size of an overlap portion of the digital content presented to the user;

whether the digital content includes augmented reality content or virtual reality content;

a type of digital content;

operating parameters of an image display system or of first and second optical display surfaces of the head-mounted device;

an age of the user;

a visual impairment experienced by the user;

a time of day;

an amount of time the user has used the head-mounted device; or an ambient light level of a local environment.

15. The method of claim 13, further comprising:

upon receiving an input from the user or upon exceeding a predetermined period of use, modifying the first and second instances of the visual stabilizer by increasing brightness, size, contrast, or resolution of the first and second instances.

16. The method of claim 13, further comprising:

upon receiving an input from the user or upon exceeding a predetermined period of use, adding another instance of the visual stabilizer to each of the first and second composite images, or adding an instance of another visual stabilizer to each of the first and second composite images.

17. The method of claim 13, wherein the first and second instances of the visual stabilizer are created using a software development kit and are integrated into the first and second digital images during creation of the digital content.

18. The method of claim 13, further comprising:

modifying a characteristic of the first and second instances of the visual stabilizer after the head-mounted device has been used by the user for a certain period of time, wherein the characteristic is selected from size, shape, position, color, brightness, and contrast of the first and second instances of the visual stabilizer.

* * * * *